United States Patent [19]

Shibata et al.

[11] Patent Number: 4,613,912
[45] Date of Patent: Sep. 23, 1986

[54] RECORDING AND REPRODUCING APPARATUS FOR A VIDEO TAPE RECORDER

[75] Inventors: Akira Shibata; Atsushi Yoshioka; Katsuyuki Watanabe, all of Katsuta, Japan

[73] Assignee: Hitachi, Ltd., Tokyo, Japan

[21] Appl. No.: 530,628

[22] Filed: Sep. 9, 1983

[30] Foreign Application Priority Data

Sep. 10, 1982 [JP] Japan .............................. 57-156602
Nov. 1, 1982 [JP] Japan .............................. 57-190846
Jan. 28, 1983 [JP] Japan .............................. 58-11556

[51] Int. Cl.⁴ .......................................... H04N 5/782
[52] U.S. Cl. ................... 360/19.1; 358/341; 358/343; 360/10.2
[58] Field of Search ............... 358/315, 316, 323, 341, 358/343; 360/19.1, 18, 10.2

[56] References Cited

U.S. PATENT DOCUMENTS 4,390,906 6/1983 Furumoto et al. ................. 360/19.1

Primary Examiner—Robert L. Richardson
Attorney, Agent, or Firm—Antonelli, Terry & Wands

[57] ABSTRACT

In a video tape recorder of the two-head helical scan system, a wrap angle of a magnetic tape around a rotary head mechanism is set to more than 180°, e.g. about 220°, and an overlap recording section is provided in a recording track. A time compressed audio signal and a pilot signal for the tracking control are recorded in the overlap recording section. A frequency modulated luminance signal, low-frequency converted carrier color signal, frequency modulated audio signal, and pilot signal are mixed, and this mixed signal is recorded in another section of the recording track. Regulator means is provided to conjointly set the recording current levels of the low-frequency converted carrier color signal, frequency modulated audio signal, and pilot signal which are mixed to the frequency modulated luminance signal and recorded. The recording current levels of the time compressed audio signal and the frequency modulated luminance signal are respectively and individually set. When different kinds of magnetic tapes (e.g. metal powder tape and metal evaporated tape) are used, a level switching circuit is provided to switch the recording level of the signal of which the low-frequency converted carrier color signal, frequency modulated audio signal and pilot signal were mixed in accordance with the kinds of tapes.

15 Claims, 48 Drawing Figures

RECORDING AND REPRODUCING APPARATUS FOR A VIDEO TAPE RECORDER

The present invention relates to an apparatus for recording and reproducing video and audio signals, and more particularly, to a recording and reproducing apparatus which is suitable to record an audio signal on video tracks using video heads on the basis of a video tape recorder of the two-head helical scan system.

Conventionally, in video tape recorders, an audio signal has been recorded in and reproduced from an audio dedicated track provided longitudinally on a magnetic tape using a fixed head. With the demands on miniaturization of the apparatus, long-time recording with the same tape, or the like, the tape run speed has been reduced and the width of the audio track has been narrowed. Thus, it is difficult to obtain a reproduction audio signal with excellent sound quality. This tendency is remarkable in the video tape recorder for use at home, in particular.

On the other hand, an idea is known whereby the audio signal is converted into, for example, a frequency modulation signal and this FM signal is added to the video signal, thereby recording in the video track using rotary heads. According to this method, the relative speed between the heads and the magnetic tape is larger than the tape run speed in dependence upon the rotational speed of the rotary heads. Therefore, it is possible to record and reproduce while maintaining enough good sound quality. However, in this method, it is necessary to simultaneously record the audio signal together with the video signal and there is a problem such that it is impossible to record only the audio signal such as narration, music and poetry, etc. after the recording in accordance with the scene recorded (hereinafter, this is referred to as an after recording).

In addition, an idea is known whereby the wrap angle of the tape around the cylindrical tape guide of the rotary head apparatus is set to be larger than the value which is needed for the standard recording and reproduction (e.g. 180° with the 2-head helical scan system), and the video signal is recorded in the section corresponding to 180° and the audio signal which has been time-compressed is recorded in the remaining wrap section. According to this method, the section in which the video signal has been recorded is separated from the section in which the audio signal has been recorded since the audio signal is recorded in the track formed on the extending section of the video track. Hence, it is not limited to simultaneously record the video and audio signals and after recording is enabled. Furthermore, the frequency band similar to the frequency band to be used for recording the video signal can be also utilized for the audio signal, thereby enabling the reproduction audio signal with high sound quality to be realized.

However, this method requires complicated processings such as the processing for time compression and various processings in association with the recording and reproduction of the audio signal by the video heads, or the like. Thereafter, no construction is known which is suitable for application to an actual product, particularly to video tape recorders for use at home that are extremely limited with respect to production cost and dimensions. The actual product using this method is not yet released.

It is an object of the present invention to provide a recording and reproducing apparatus with a simple construction which can record and reproduce an audio signal with high sound quality and easily secure the necessary performances.

To accomplish the above object, the present invention has advantages such that: the wrap angle of the magnetic tape around the cylindrical tape guide of the 2-head helical scan system is set to be e.g. total about 220° larger than that of ordinary recording system, that is 180° +margin, the carrier color signal converted into the low frequency, frequency modulated audio signal, and pilot signal for controlling the tracking are added to the frequency modulated luminance signal, and this added luminance signal is recorded in the section in the range (180° +margin) to be used for the standard recording; and the time compressed and modulated audio signal to which the pilot signal was added is recorded in the section in the remaining range (e.g. 30°).

Furthermore, to adjust the recording levels of each signal, there is provided a recording current setting circuit after mixing the carrier color signal at low frequency band, modulation audio signal and pilot signal, and a recording current setting circuit is also provided for adjusting the respective levels of the modulation luminance signal and the time compressed audio signal. With such an arrangement, an optimum construction can be realized.

The present invention will be apparent from the following detailed description taken in conjunction with the accompanying drawings, in which.

Figure 1:
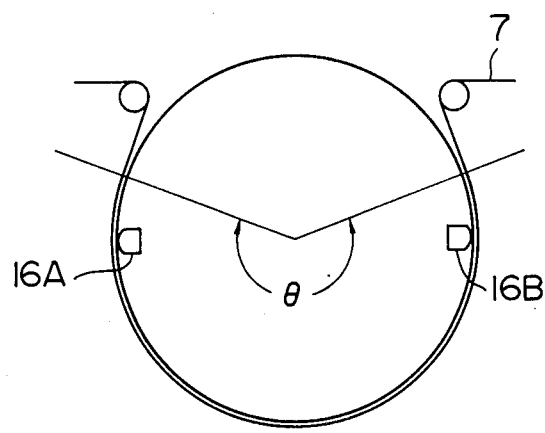
FIG. 1 is a schematic plan view showing the relationship between the rotary heads and the magnetic tape which are employed to a recording and reproducing apparatus according to the present invention.

FIG. 1 shows a schematic diagram showing the relationship between the rotary heads and the magnetic tape which are applied to the recording and reproducing apparatus according to the present invention. A magnetic tape 7 is wrapped and runs around a cylindrical tape guide in which two video heads 16A and 16B are disposed, wherein a range where the magnetic tape comes into contact with these video heads 16A and 16B, i.e. a wrap angle $\theta$ of the tape around the tape guide is, e.g. about 220°. Thus, these two video heads simultaneously come into contact with the magnetic tape 7 in the range of about 40° corresponding to the wrap angle over 180°. Signals can be recorded in and reproduced from this section; hereinbelow, referred to as an overlap section. The range of about 10° in this overlap section is provided for compatibility with other VTR systems, and is used as a margin. Then a time compressed audio signal is recorded in the remaining range of about 30°.

Figure 2A:
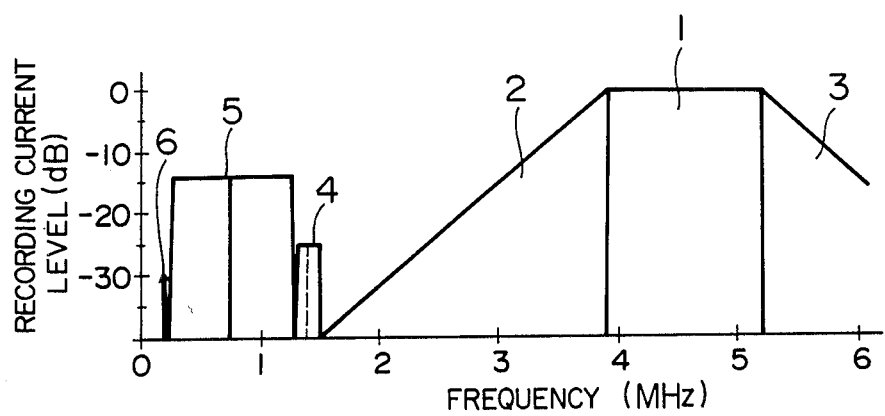
FIGS. 2a and 2b are frequency spectra showing examples of the recording signal.

FIG. 2A shows an example of the spectrum of the signal to be recorded under the state of such rotary heads and magnetic tape.

Referring to FIG. 2A, a reference numeral 1 denotes an FM carrier of the signal of which a luminance signal was converted into a frequency modulated signal (hereinafter, referred to as an FM luminance signal); 2 is lower side band waves of this FM luminance signal; and 3 indicates upper side band waves, respectively. A numeral 4 represents a signal of which an audio signal was converted into the frequency modulated signal (hereinafter, referred to as an FM audio signal); 5 is a signal of which a carrier color signal was converted into the low-frequency signal; and 6 is a pilot signal.

Examples of the concrete frequencies of these signals are as follows.

The FM luminance signal 1 has a synchronous peak of 3.9 MHz and a white peak of 5.2 MHz. The frequency of the low-frequency carrier color signal 5 is set to $(47+\frac{1}{4})fH$ in case of NTSC system and to $(47-\frac{1}{8})fH$ in case of CCIR system; and the difference in the frequencies of the low-frequency color signals in the adjacent video tracks is set to $\frac{1}{2}fH$ for the NTSC system and to $\frac{1}{4}fH$ for the CCIR system.

More concretely, it may be possible to change the frequencies for every track, and the phase turn-over of 180° for the NTSC system and the phase shift of 90° for the CCIR system may be respectively performed every 1H (one period of horizontal sync. signal) to only the low-frequency color signal that will be written in one track between two tracks by two heads.

The FM audio signal 4 has a carrier frequency of 1.4 MHz and a maximum frequency deviation of 100 kHz.

The pilot signal 6 is a signal to apply to the tracking servo upon playback, it serves to record four carriers having different frequencies which change in the order of, for example, $f_1 \rightarrow f_2 \rightarrow f_3 \rightarrow f_4 \rightarrow f_1 \rightarrow f_2 \ldots$ at every field period of the video signal. As examples of the frequencies, $f_1 \div 6.5$ fH, $f_2 \div 7.5$ fH $f_3 \div 10.5$ fH, and $f_4 \div 9.5$ fH (wherein, fH: horizontal sync. frequency).

Generally, $|f_1-f_2| \neq |f_4-f_3|$ and any signal which has a frequency of not higher than 200 kHz and has a frequency offset against fH may be used.

Such a frequency arrangement and recording levels as shown in FIG. 2a are set to the values in consideration of the interference and disturbance between them.

Figure 2B:
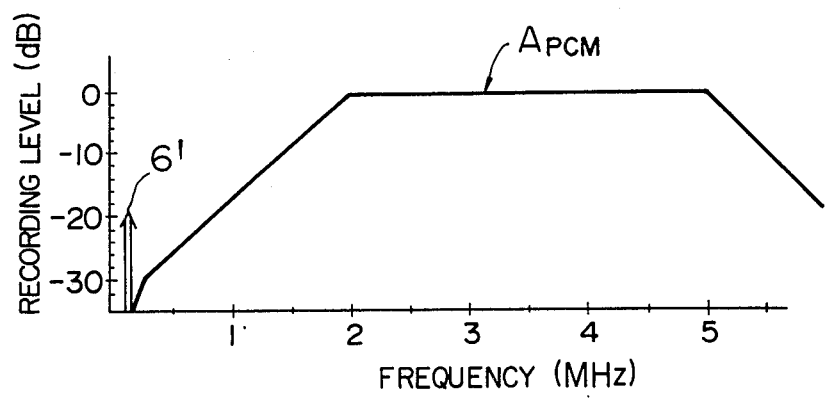

It is necessary that the spectrum of the time compressed audio signal is similar to the spectral 1, 2 and 3 of the FM luminance signal of FIG. 2a as shown in FIG. 2b. As an example, it can be obtained by converting the two-channel audio signals each having a frequency band of about 15 kHz into the PCM (pulse code modulation) signals of 8-10 bits and then time compressing into approximately 1/6 to $\frac{1}{8}$.

A numeral 6' indicates a pilot signal and it is possible to raise the recording level by about 10 dB higher than FIG. 2a. In the case of FIG. 2a, when the recording level of the pilot signal is raised, the low-frequency color signal is largely disturbed; however, an increase in the recording level of the pilot signal in FIG. 2b merely results in a very slight decrease in the error rate of the audio PCM signal. Therefore, the recording level of the pilot signal 6' can be raised in dependence upon necessity. Although the low-frequency color signal and the audio FM signal are not added in FIG. 2b, even if they are added, the error rate of the audio PCM signal will not actually cause any problem.

If the quality of the audio PCM signal is highlighted, the addition of the low-frequency color signal and FM audio signal is inhibited and furthermore, the recording level of the pilot signal may be suppressed to the order of −30 dB.

Figure 3:
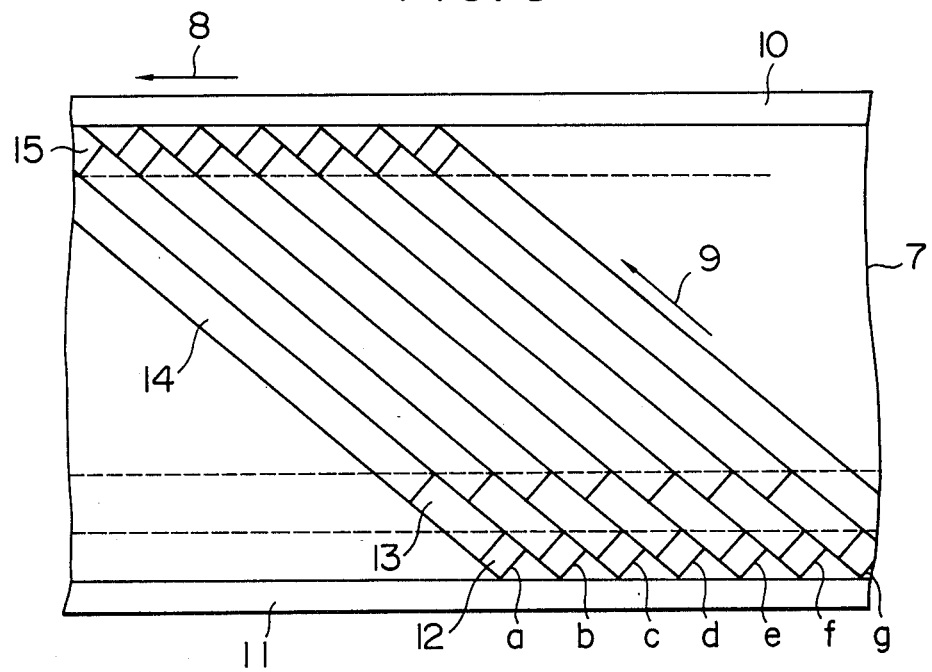
FIG. 3 illustrates an example of the recording pattern on the magnetic tape upon recording according to the present invention.

FIG. 3 is a diagram illustrating an example of the recording pattern on the tape on which such a signal was recorded. In FIG. 3, a reference numeral 7 indicates a video tape; 8 is an arrow indicative of the tape run direction; 9 is an arrow indicating the tracing direction of the video heads; 10 is a first optional track provided in the upper end of the tape; 11 is a second optional track provided in the lower end of the tape; 12 is a first overlap track provided in the leading portion of the oblique track; 13 is a track in which audio signal which was time compressed and converted into the PCM signal (hereinafter, referred to as $A_{PCM}$) and the pilot signal (hereinafter, referred to as a P signal) are recorded; 14 is a track in which the FM luminance signal (hereinafter, referred to as $Y_{FM}$), carrier color signal which was converted into the low-frequency signal (hereinafter, referred to as $C_L$), FM audio signal (hereinafter, referred to as $A_{FM}$), and P signal are recorded; and 15 is a second overlap track provided in the trailing portion of the oblique track.

Figure 4:
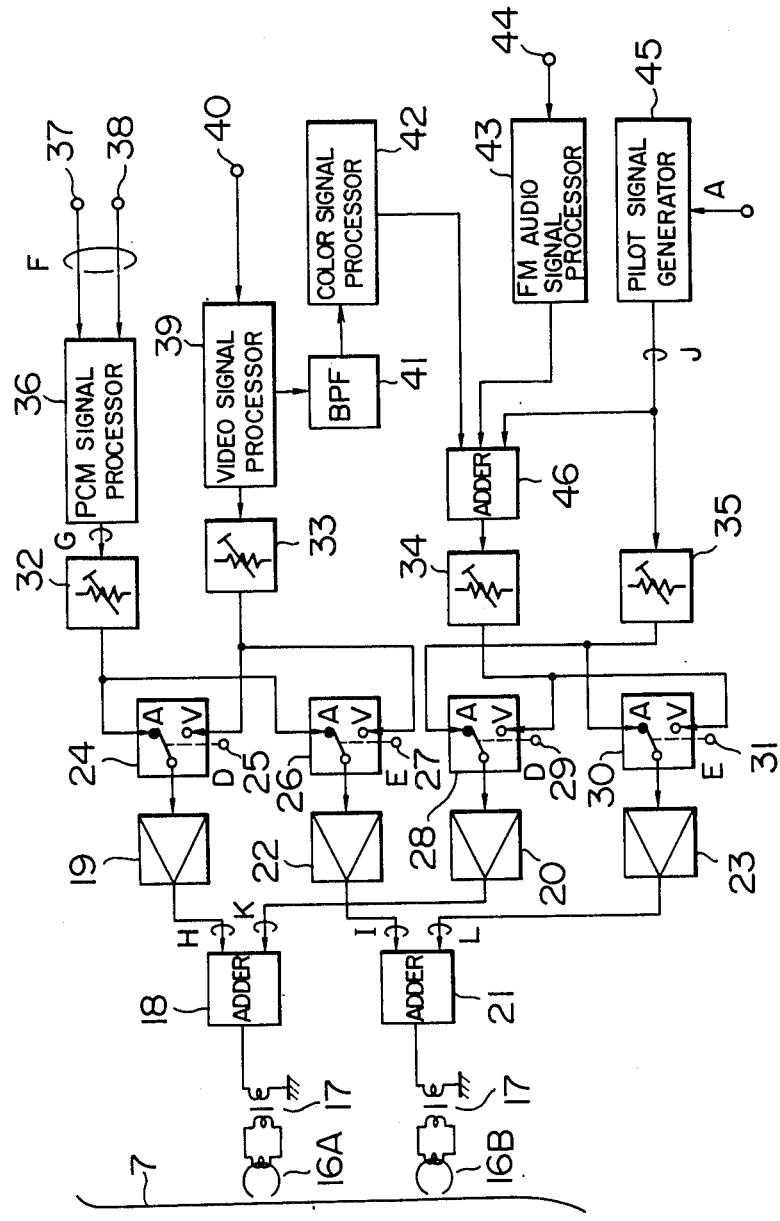
FIG. 4 is a block diagram showing one embodiment of the recording circuit according to the present invention.

FIG. 4 is a block diagram showing one embodiment of the recording circuit of the present invention to form the recording pattern of FIG. 3. FIGS. 5A to 5L are waveform diagrams showing the waveform in each section of FIG. 4.

In FIG. 4, a numeral 7 is the magnetic tape and two video heads 16A and 16B are actually arranged in the relation as shown in FIG. 1. The recording signal is supplied through a rotary transformer 17 to the video heads 16A and 16B.

The two-channel audio signals (FIG. 5F) applied to input terminals 37 and 38 are respectively time compressed by a PCM processor 36 and then converted into the PCM signals. For the time compression and conversion into the PCM signals, well-known technologies that will be generally used for such processings for an audio signal may be utilized. An output signal of this PCM processor 36, i.e. an $A_{PCM}$ signal (FIG. 5G) is applied through a recording current setting circuit 32 to each one input A of two change-over switching circuits 24 and 26.

A video signal applied to an input terminal 40 is supplied to a video processor 39, where a luminance signal is extracted and the frequency modulation is performed using this luminance signal as a modulation signal. A $Y_{FM}$ signal output from this video processor 39 is supplied to a recording current setting circuit 33. On the other hand, a carrier color signal is extracted from the video signal before modulation by a band pass filter 41 and then frequency-converted into the low-frequency band on the lower side of the $Y_{FM}$ signal as shown in FIG. 2a by a color processor 42. The technologies of the frequency modulation of this luminance signal and the frequency conversion of the carrier color signal are the same as those in the video signal processing in standard video tape recorders for use at home. The FM luminance signal ($Y_{FM}$ signal) output from the recording current setting circuit 33 is supplied to each of the other inputs V of the change-over switching circuits 24 and 26. The carrier color signal $C_L$ which was converted into the low-frequency band to be output from the color processor 42 is supplied to an adder 46 for adding three signals.

The other one input of the adder 46 receives an FM audio signal which is obtained from an FM audio processor 43 and is arranged between the FM luminance signal and the low-frequency carrier color signal such as, for example, shown in FIG. 2a. This signal is the signal which was frequency modulated by the audio signal applied to an input terminal 44. The audio signal to be applied to the input terminal 44 may be the same signal as or different signal from the audio signal to be applied to the input terminal 37 or 38. However, since the audio signal applied to the input terminal 44 is added to the video signal and recorded, it is limited to the signal that may be simultaneously recorded together with the video signal.

A signal to be supplied to the remaining input of the adder 46 is a pilot signal for controlling the tracking which is output from a pilot signal generator 45. These three added signals are supplied through a recording current setting circuit 34 to each one input V of change-over switching circuits 28 and 30. Furthermore, a part of the pilot signal output from the pilot signal generator 45 is solely supplied through a recording current setting circuit 35 to each of the other inputs A of two change-over switching circuits 28 and 30. Outputs of four change-over switching circuits 24, 26, 28, and 30 are supplied to recording amplifiers 19, 22, 20, and 23, respectively. Outputs of the recording amplifiers 19 and 20 are added by an adder 18, and then supplied through the rotary transformer 17 to the video head 16A. Outputs of the amplifiers 22 and 23 are added by an adder 21, and then supplied through the rotary transformer 17 to the video head 16B.

The change-over switching circuits 24, 26, 28, and 30 perform the switching operation, respectively, in accordance with control signals to be applied to control terminals 25, 27, 29, and 31. This switching operation is done in such a manner that the signal at the input A is output when the control signal is high "h", and the signal at the input V is output when the control signal is low "L". These control signals are generated as follows.

Figure 5:
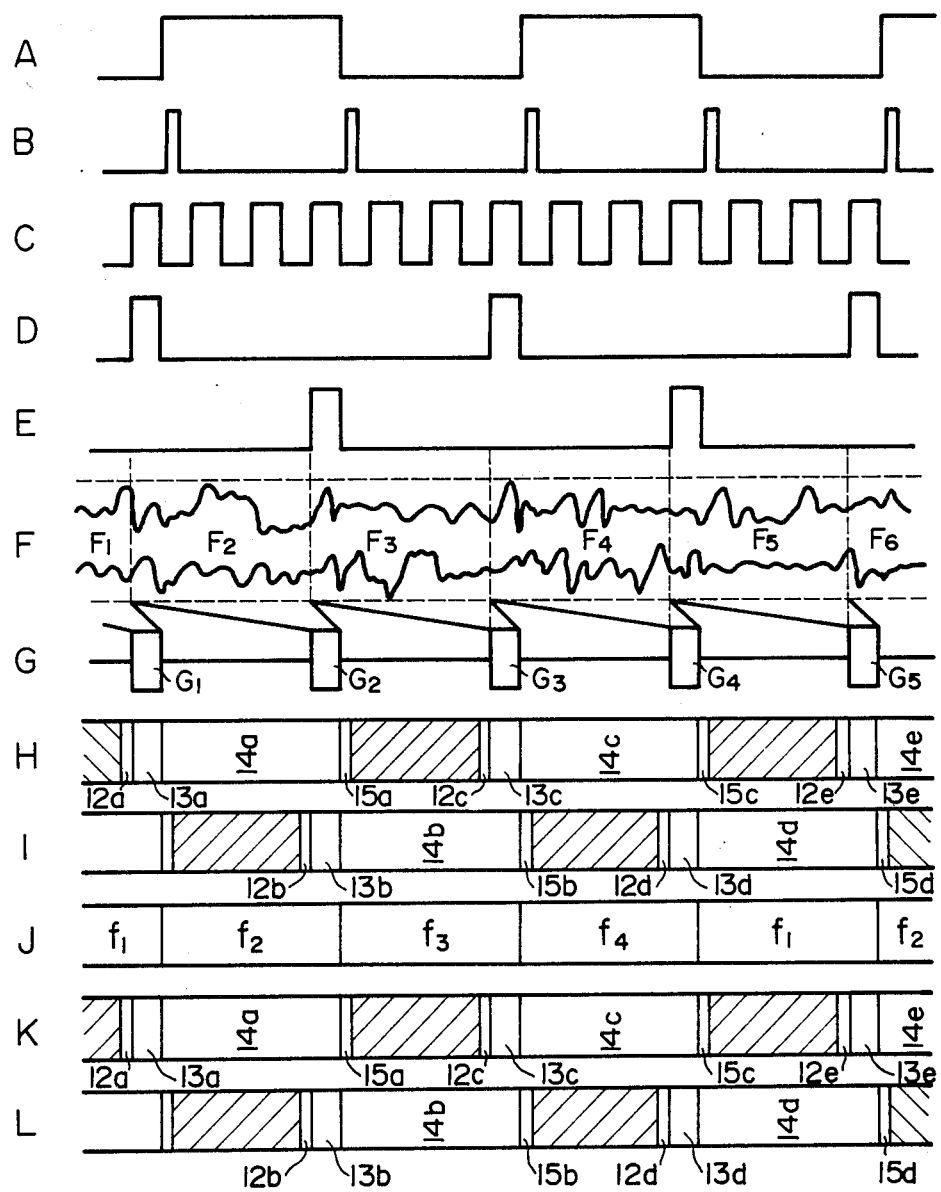
FIGS. 5A–5L are signal waveform diagrams in each section of the circuit shown in FIG. 4.

FIG. 5A shows a pulse signal which is obtained synchronously with the rotations of the video heads 16A and 16B, this pulse signal is obtained in the same way as the head change-over signal generated with the standard video tape recorder; and a fixed phase relationship is maintained between this pulse signal and the vertical sync signal of the video signal to be recorded shown in FIG. 5B. Such signal generation means is obtained by similar signal generation means in well-known video tape recorders; therefore, its detailed description is omitted.

Using this pulse signal A as a reference, a pulse signal C (FIG. 5C) which is synchronized with this pulse signal A and has a repetitive frequency of six times that of the pulse signal A is generated. Next, on the basis of this pulse signal C, pulse signals D and E as shown in FIGS. 5D and 5E are generated; namely, the repetitive periods of these pulses are the same as that of the pulse signal A and the pulse widths are identical to that of the pulse C shown in FIG. 5C. The phase of the pulse signal E is shifted by just half period from the phase of the pulse signal D. The generation of these pulse signals C, D and E can be easily realized by an ordinary fundamental pulse technology. This pulse signal D is used as a control signal to control the change-over switching circuits 24 and 28. The pulse signal E is used as a control signal to control the change-over switching circuits 26 and 30. Therefore, each of the change-over switching circuits 24, 26, 28, and 30 is switched to the input A side only in the period when these pulse signals appear, while they are switched to the input V side in the other periods.

FIGS. 5H, 5I, 5K, and 5L schematically show the output signals of the recording amplifiers 19, 22, 20, and 23, respectively. Reference numerals in the signals represent the timings corresponding to each recording track shown in FIG. 3, and the hatched sections indicate the periods when the video heads do not trace on the magnetic tape.

FIG. 5J shows the output pilot signal of the pilot signal generator 45, and the change-over of the frequency is controlled by the pulse signal A in such a manner as to be $f_1 \rightarrow f_2 \rightarrow f_3 \rightarrow f_4 \rightarrow f_1 \rightarrow f_2 \ldots$ at every field of the video signal.

Next, the operation to record each signal in each track on the magnetic tape will be described.

When the video head 16A starts forming a track 14a of FIG. 3 and the head 16B does not trace on the tape, all of the switches 24, 26, 28, and 30 are connected to the V side since both control signals D and E are at "L" level.

Thus, during the period when the head 16A forms the track 14a and the head 16B does not trace on the tape, both signals H and I become the output signal $Y_{FM}$ of the video processor 39, and both signals K and L become $C_L+A_{FM}+P(f_2)$ which is the output signal of the adder 46. Therefore, $Y_{FM}+C_L+A_{FM}+P(f_2)$ is recorded in the track 14a in this period.

Next, the period when the head 16B traces on a track 12b will be described. The head 16A is tracing on the track 14a during this period and all of the switches 24, 26, 28, and 30 are connected to the V side, and the signals H, I, K, and L are the same as those described above. Therefore, $Y_{FM}+C_L+A_{FM}+P(f_2)$ is recorded in the tracks 12b and 14a in this period.

The period when the head 16B forms a track 13b will now be described. During this period, the pulse E becomes a High voltage as shown in FIG. 5E, and the pulse D remains to be a Low voltage. Hence, the switches 24 and 28 are connected to the V side, while the switches 26 and 30 are connected to the A side; therefore, the H signal becomes $Y_{FM}$, I signal becomes $A_{PCM}(G_2)$, and K signal becomes $C_L+A_{FM}+P(f_2)$. Thus, $A_{PCM}(G_2)+P(F_2)$ is recorded in the track 13B, and $Y_{FM}+C_L+A_{FM}+P(f_2)$ is recorded in the track 14a, respectively, in this period.

Next, the period when the head 16A forms a track 15a will be described. In this period, both pulses D and E are Low, and all of the switches 24, 26, 28, and 30 are connected to the V side. Thus, $Y_{FM}+C_L+A_{FM}+P(f_3)$ is recorded in the tracks 15a and 14b in this period.

Then, the period when the head 16A does not trace on the tape but the head 16B traces on a track 14b will be described. During this period, all switches 24, 26, 28, and 30 are also connected to the V side. Therefore, $Y_{FM}+C_L+A_{FM}+P(f_3)$ is recorded in the track 14b in this period.

The period when the head 16A forms a track 12c will now be described. All switches 24, 26, 28, and 30 are also connected to the side V in this period. Thus, $Y_{FM}+C_L+A_{FM}+P(f_3)$ is recorded in the tracks 12c and 14b in this period.

Next, the period when the head 16A forms a track 13c will be described. In this period, the pulse D is High and the pulse E is Low. Therefore, the switches 24 and 28 are connected to the A side, and the switches 26 and 30 are connected to the V side. Thus, $A_{PCM}(G_3)+P(f_3)$ is recorded in the track 14b in this period.

In this way, similarly, $Y_{FM}+C_L+A_{FM}+P(f_4)$ is recorded in tracks 14c, 15b and 12d; $A_{PCM}(G_4)+P(f_4)$ is recorded in a track 13d; $Y_{FM}+C_L+A_{FM}+P(f_1)$ is recorded in tracks 15c, 14d and 12e; and $A_{PCM}(G_5)+P(f_1)$ is recorded in a track 13e, respectively.

Figure 6:
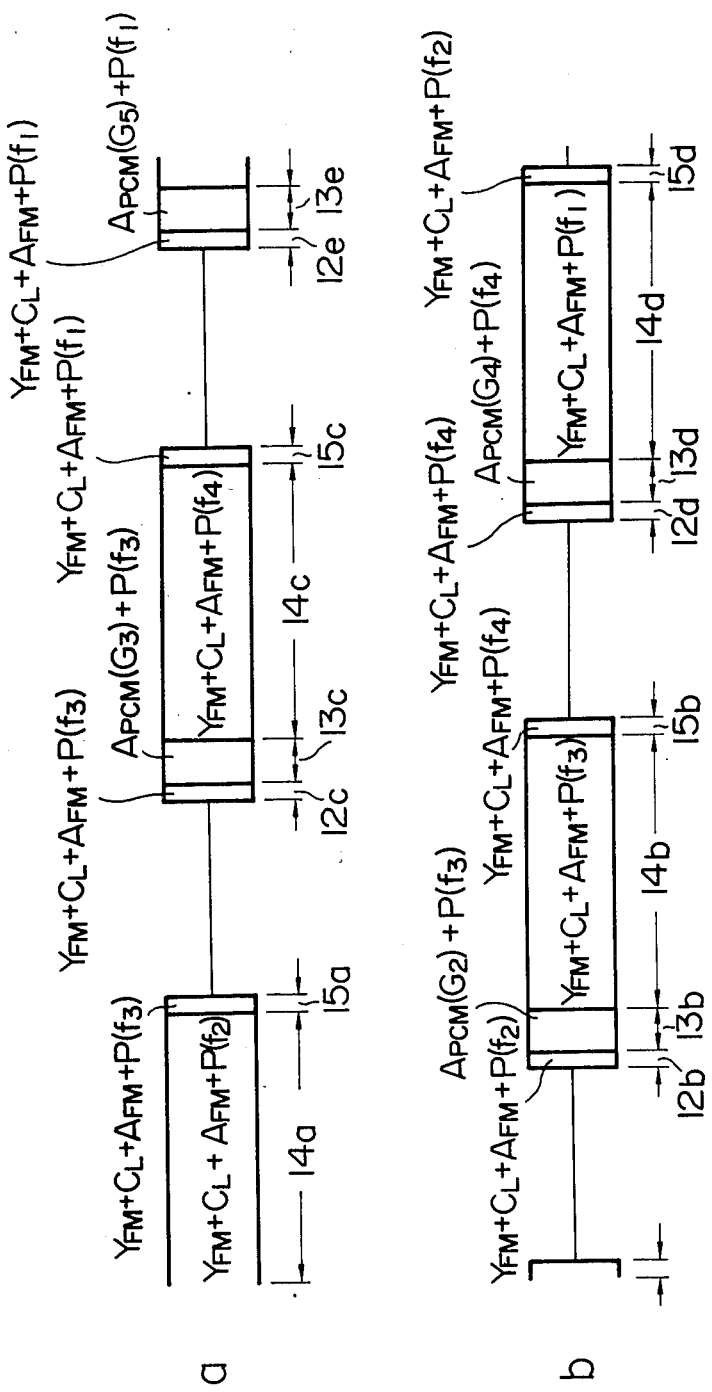
FIGS. 6a and 6b are waveform diagrams showing examples of the signal to be recorded by each video head.

The signals which are recorded in such a way as described in the above are conjointly shown in FIG. 6. FIG. 6a indicates the signal to be recorded by the video head 16A, and FIG. 6B represents the signal to be recorded by the video head 16B.

The features of the circuit arrangement of FIG. 4 will now be described.

In FIG. 4, the arrangement of four recording current setting circuits 32, 33, 34, and 35 which are provided in the positions shown in this block diagram minimizes the number of regulation circuits and optimizes the recording currents of the $Y_{FM}$ and $A_{PCM}$ signals, respectively. The recording current levels of the $Y_{FM}$ and $A_{PCM}$ signals are generally selected to be almost equal. However, the recording current of the $Y_{FM}$ signal also serves as the bias current to record the $C_L$ and $A_{FM}$ signals; therefore, it may be preferable to select the level of the $Y_{FM}$ signal to be a value by 1-2 dB larger than the optimum recording current level.

The proper regulation of the recording current setting circuit 32 enables the $A_{PCM}$ signal currents flowing through the heads 16A and 16B to be simultaneously set.

The $Y_{FM}$ signal current flowing through the heads 16A and 16B can be also simultaneously set by regulating the recording current setting circuit 33.

Since the $C_L$, $A_{FM}$ and P signals are recorded using the $Y_{FM}$ or $A_{PCM}$ signal as the bias, respectively, and the optimum mixing ratio is not fixed to the value shown in FIG. 2a or 2b but should be changed in dependence upon the characteristics of the heads to be used. In general, the characteristic of the sole head is measured to classify the head, and then after assembling into the set, the above mixing ratio is changed in accordance with this classification.

FIG. 4 shows an example of the arrangement which can set the reasonable mixing ratio in consideration of such situation. According to FIG. 4, after the $C_L$, $A_{FM}$ and P signals have been added at constant levels, the regulation is done by one recording current setting circuit 34. The proper regulation of this circuit 34 enables the mixing ratio of the $C_L$, $A_{FM}$ and P signals against the $Y_{FM}$ signal which will flow through the heads 16A and 16B to be simultaneously set.

The recording current setting circuit 35 also serves as a mixing ratio setting circuit for the P signal to be recorded using the $A_{PCM}$ signal as the bias and simultaneously sets the currents flowing through both heads 16A and 16B.

In the embodiment shown in FIG. 4, the signal currents flow through the heads 16A and 16B even in the hatched sections in FIGS. 5H, 5I, 5K, and 5L, namely in the period when the heads do not trace on the magnetic tape, thereby omitting the switching circuit of the heads or the like and simplifying the circuit arrangement. Similarly, by recording the above-mentioned signal in the tracks 12a, 12b, 12c, . . . , the circuit is simplified.

In the embodiment shown in FIG. 4, since four switches (24, 26, 28, 30) are provided, an output of each switch may be simply amplified, thereby enabling the construction of the recording amplifier to be simple.

Figure 7:
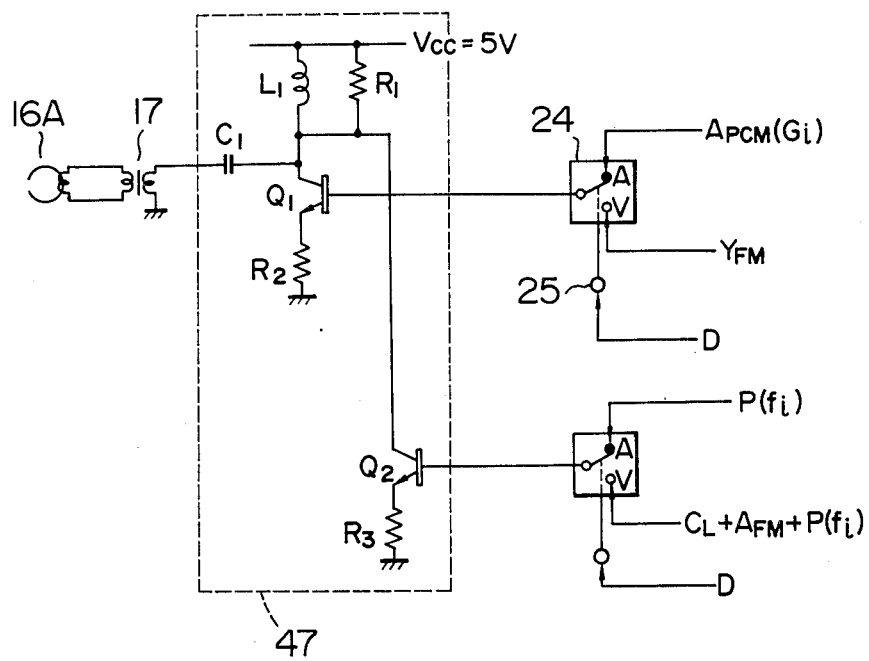
FIG. 7 shows an example of a partial concrete circuit in the embodiment shown in FIG. 4.

FIG. 7 is a circuit diagram showing one concrete embodiment of the recording amplifiers 19 and 20 and the adder 18 in FIG. 4.

A section 47 surrounded by the broken line in FIG. 7 corresponds to the adder 18 and the recording amplifiers 19 and 20 of FIG. 4. Transistors $Q_1$ and $Q_2$ constitute the recording amplifiers 19 and 20, respectively. In FIG. 7, the transistor $Q_1$ to make a larger current of about 20 mApp flow and the transistor $Q_2$ to make a smaller current of about 4 mApp flow are separately provided, so that an idle current of the transistor $Q_1$ can be diminished since no problem will occur on the cross modulation in the circuit. Moreover, there are features such that: by providing a coil $L_1$, a larger dynamic range is easily secured; a lower power voltage $V_{cc}$ can be used; an energy saving construction can be easily designed; and the frequency characteristic of the recording current can be easily smoothed.

Figure 8:
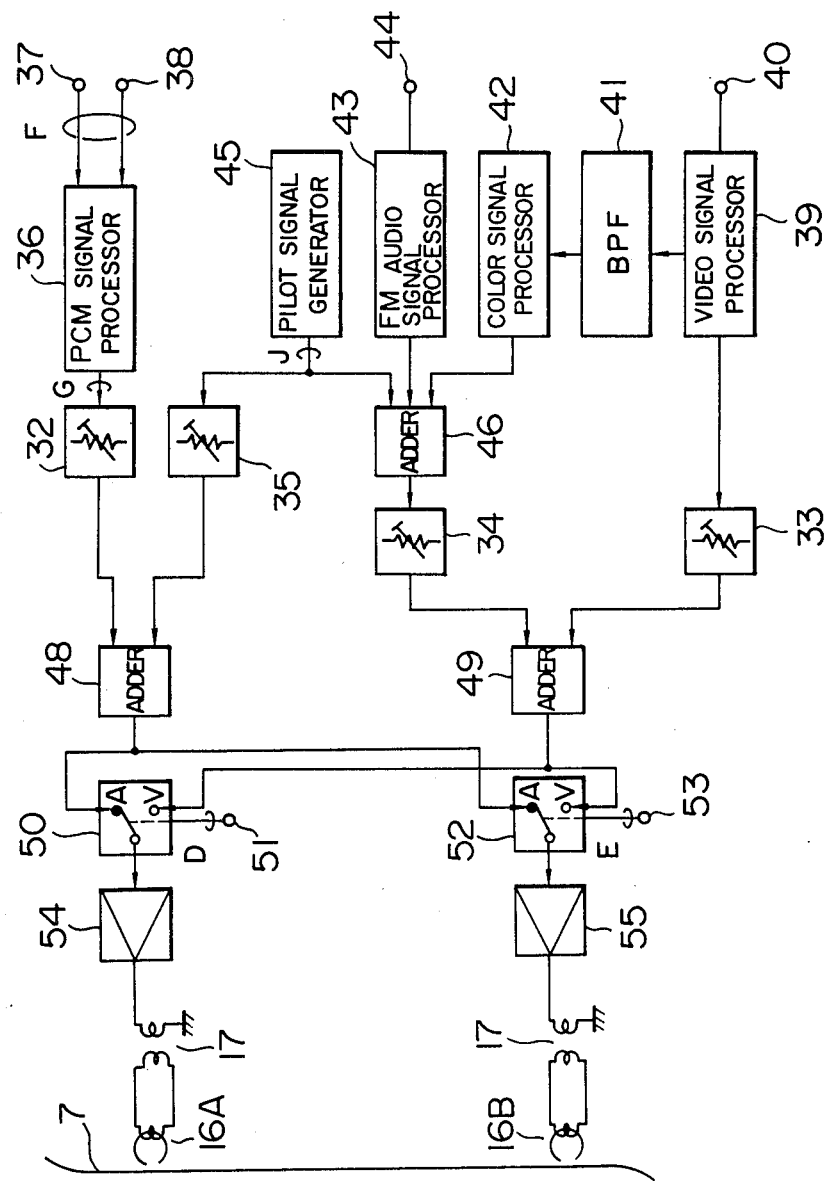
FIG. 8 is a block diagram showing another embodiment of the recording circuit according to the present invention.

FIG. 8 is a block diagram as another embodiment of the recording circuit of the present invention to form the recording pattern shown in FIG. 3.

In FIG. 8, a reference numeral 48 denotes an adder to mix the $A_{PCM}$ and P signals; 49 is an adder to mix the $Y_{FM}$ signal and the $C_L + A_{FM} + P$ signal; 50 is a switch, and a control signal having the waveform of FIG. 5D is applied to a control terminal 51, whereby the switch 50 is connected to the A side in the period when D is High, and it is connected to the V side in the period when D is Low.

A numeral 52 is a switch, and a control signal having the waveform of FIG. 5E is applied to a control terminal 53, whereby the switch 52 is connected to the A side in the period when E is High, and it is connected to the V side in the period when E is Low.

Numerals 54 and 55 are recording amplifiers, respectively.

One feature of the embodiment shown in FIG. 8 is that only two switches and two recording amplifiers are needed, respectively. The set characteristics of the recording currents are substantially the same as the embodiment of FIG. 4.

Figure 9:
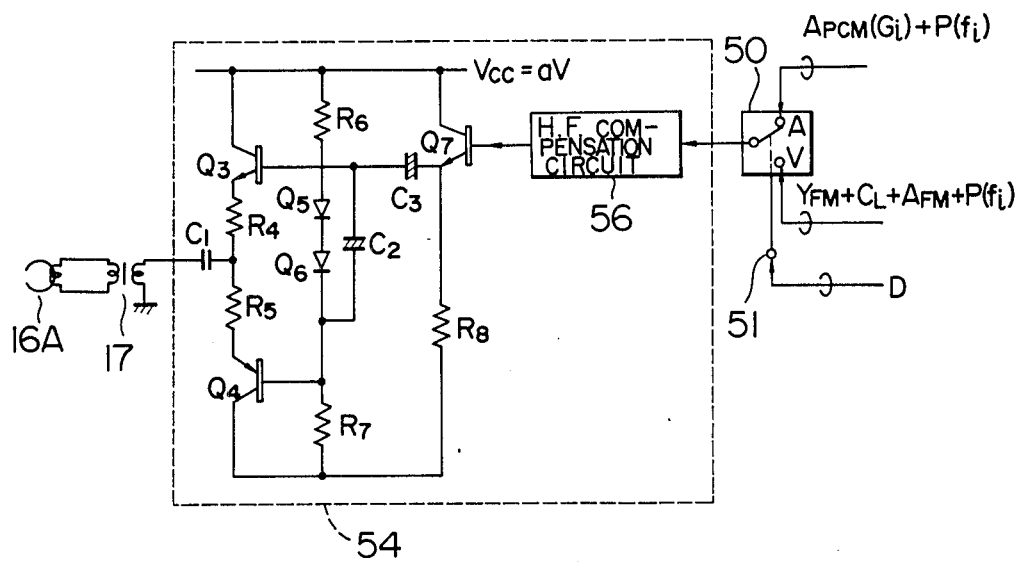
FIG. 9 is a circuit diagram showing one concrete example of the recording amplifier in the embodiment of FIG. 8.

FIG. 9 shows one embodiment of the recording amplifier 54 to be used in the embodiment shown in FIG. 8. The mixed signal of the $Y_{FM}$ signal and $C_L + A_{FM} + P$ signal is input to the recording amplifier 54; thus, the cross modulation in the recording amplifier will cause a problem. Therefore, it is necessary to use an amplifier of the push-pull type shown in FIG. 9. In this case, the amplifier 54 drives the head 16A with a constant voltage, and therefore, the frequency characteristic of the recording current is of the high-frequency attenuation type. Consequently, a high-frequency compensation circuit 56 is required to smooth the frequency characteristic of the recording current.

Figure 10:
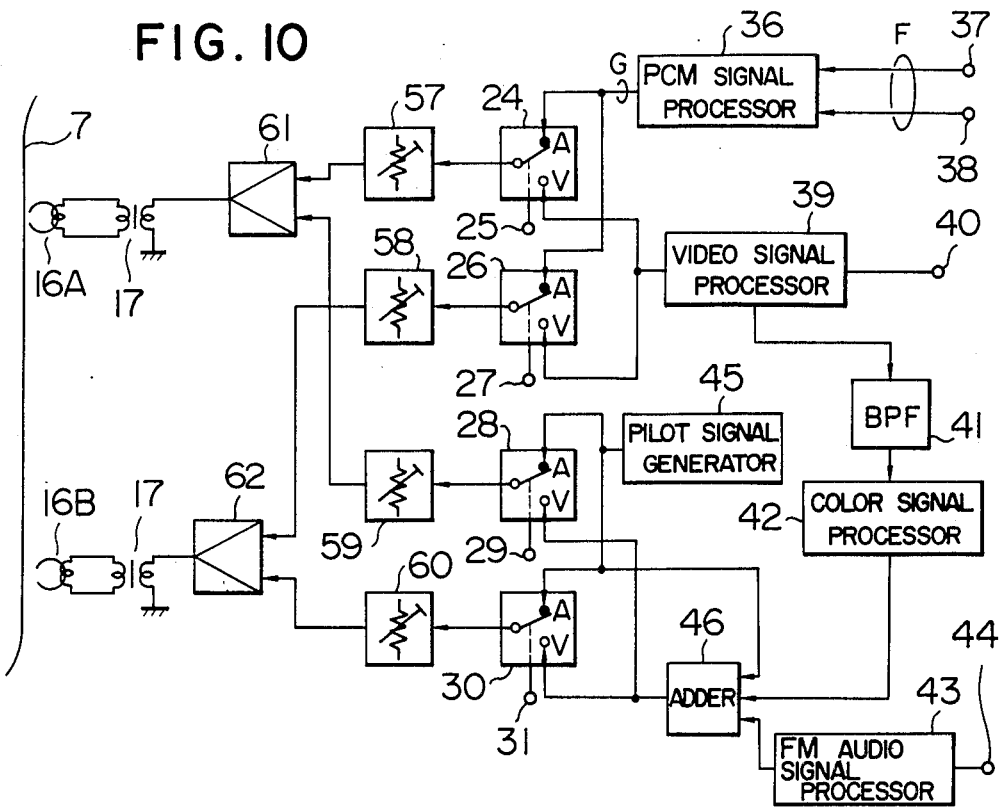
FIG. 10 is a block diagram showing further another embodiment of the recording circuit according to the present invention.

FIG. 10 is a block diagram showing further another embodiment of the recording circuit of the present invention to form the recording pattern shown in FIG. 3. A feature of the circuit arrangement of FIG. 10 is that recording current setting circuits 57, 58, 59, and 60 are provided at the rear stages of the switches 24, 26, 28, and 30. There are also provided recording amplifiers 61 and 62 to add and amplify outputs of the recording current setting circuits 57 and 59, and 58 and 60, respectively. The other arrangement is the same as the embodiment shown in FIG. 4.

With such an arrangement, the recording currents of the heads 16A and 16B can be independently set.

Next, still another embodiment of the present invention including the reproduction circuit will be described.

Figure 11:
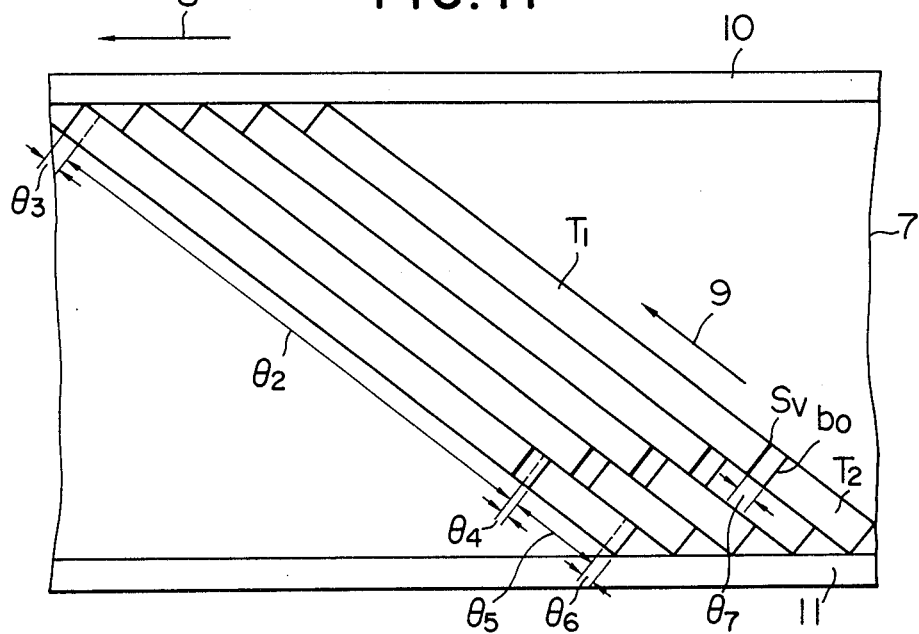
FIG. 11 illustrates in detail an example of the recording track pattern on the magnetic tape.

FIG. 11 shows a detailed example of the recording pattern shown in FIG. 3. In the diagram, a reference character $T_1$ denotes a video track in which the video signal is recorded, and $T_2$ indicates an overlap track in which the audio PCM and pilot signals are recorded. This track $T_2$ is provided on the starting side of the tracing by the video heads. $S_v$ indicates a position where the vertical sync signal of the FM luminance signal was recorded. $b_0$ represents a switching point between the FM luminance and audio PCM signals. For the wrap angle around the tape guide, $\theta_2$ in the video track $T_1$ is set to about 180°. While, $\theta_3$ is a margin to assure the compatibility and is set to about 5°.

$\theta_4$ is also a margin to secure the compatibility and is set to about 3°, and in this range the FM luminance signal is recorded. $\theta_5$ in the overlap track $T_2$ is set to about 29°, where the audio PCM signal is recorded. $\theta_6$ is a margin to secure the compatibility and is set to about 4°. Although the recording signal is not specified, it is desirable to record the preamble for easy pickup of the data in the audio PCM signal.

$\theta_7$ corresponds to the width between the switching point $b_0$ of the FM luminance and audio PCM signals and the position $S_v$ where the vertical sync signal was recorded, and $\theta_7$ is set to about 7°. An excessively large angular value of $\theta_7$ causes the switching point to appear in the reproduced picture (in the lower section of the screen), so that the screen will be unsightly; while, a too small value of $\theta_7$ causes the skew and color flicker to appear in the upper section of the screen so as to present a problem.

Figure 12:
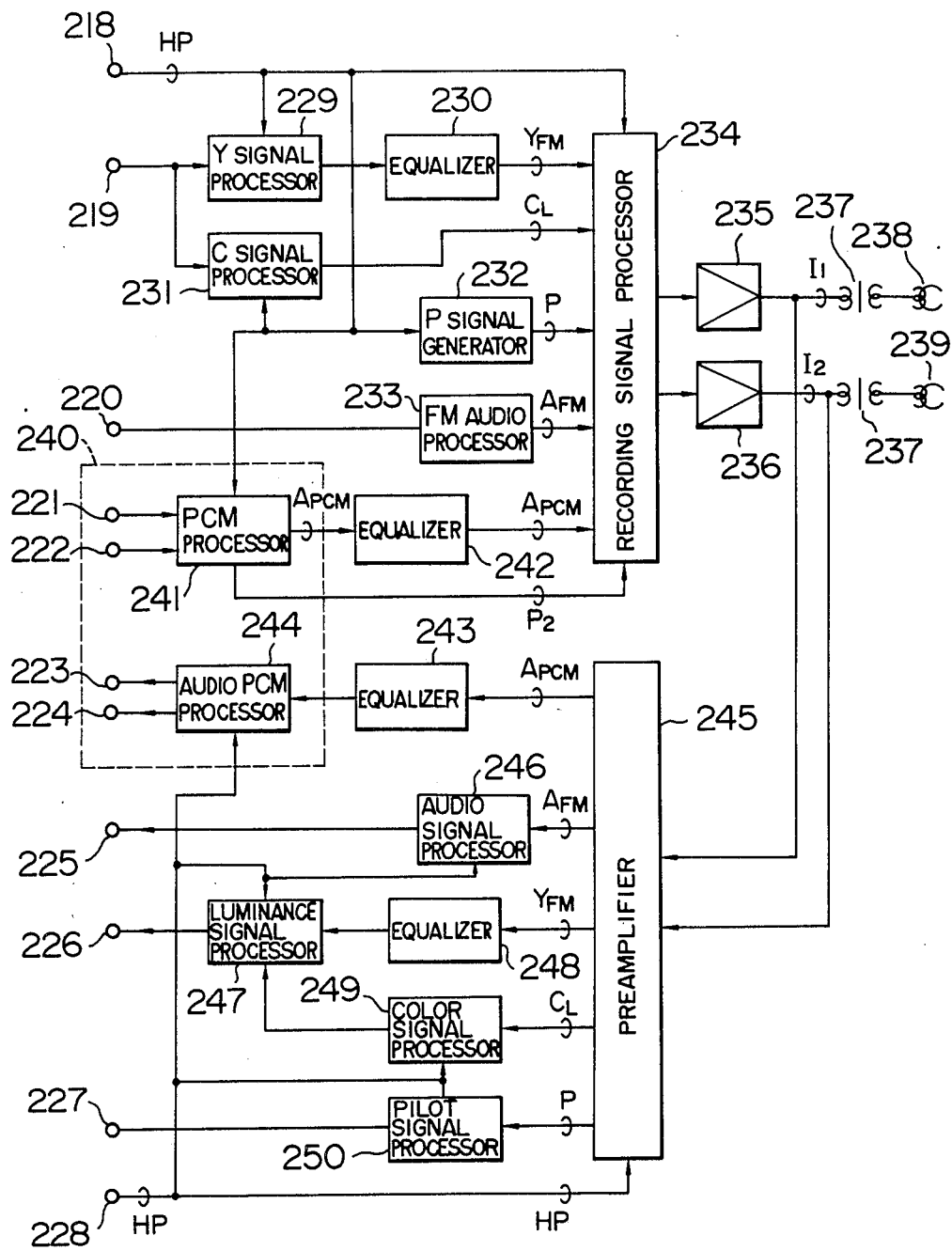
FIG. 12 is a block diagram showing one embodiment of the recording and reproducing circuit according to the present invention including the reproduction circuit.

FIG. 12 shows one embodiment of the recording and reproducing circuit to form such a recording pattern. The principal section of that recording circuit is shown in FIG. 14, and the timing charts to describe the operation are shown in FIG. 13.

Figure 13:
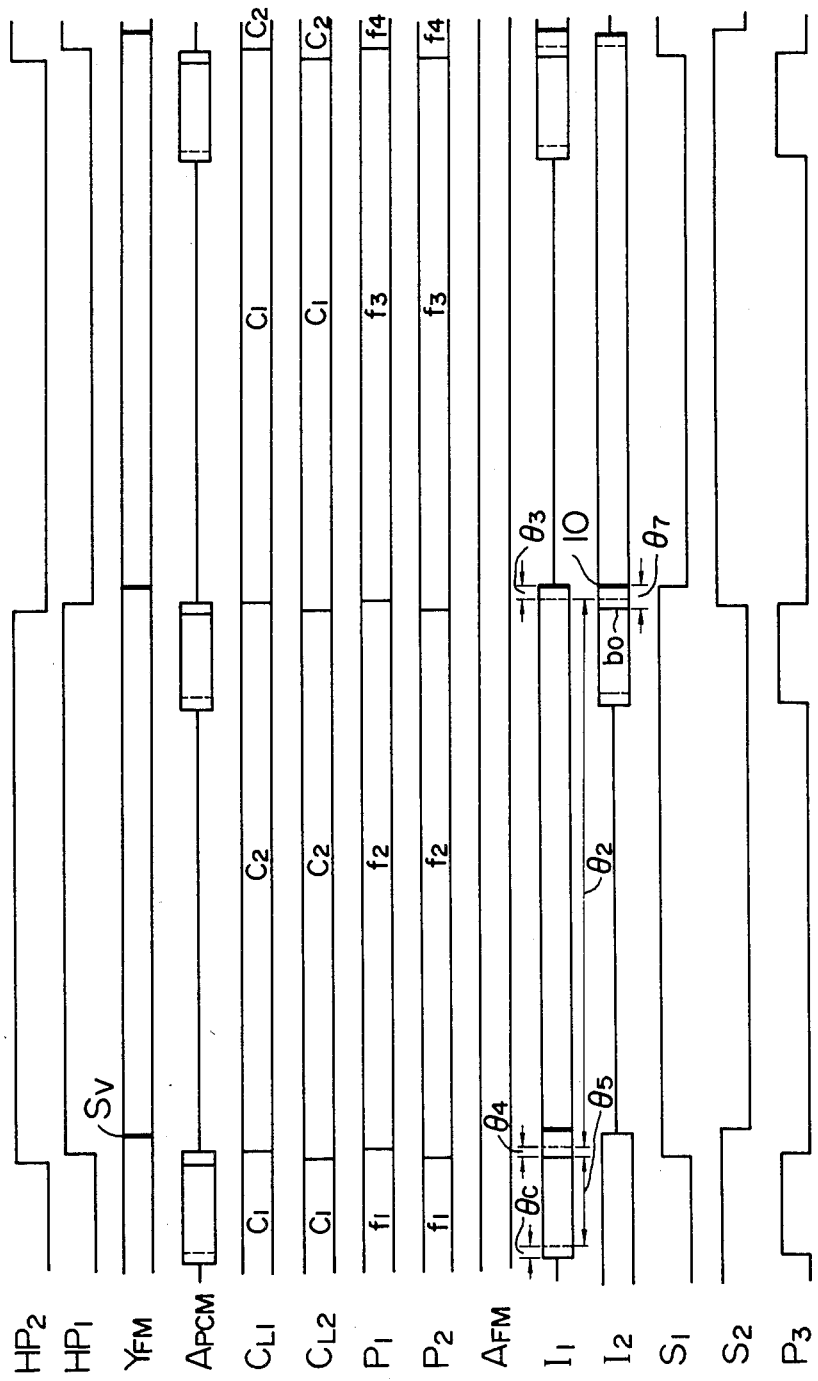
FIG. 13 shows timing charts to describe the operation.
Figure 14:
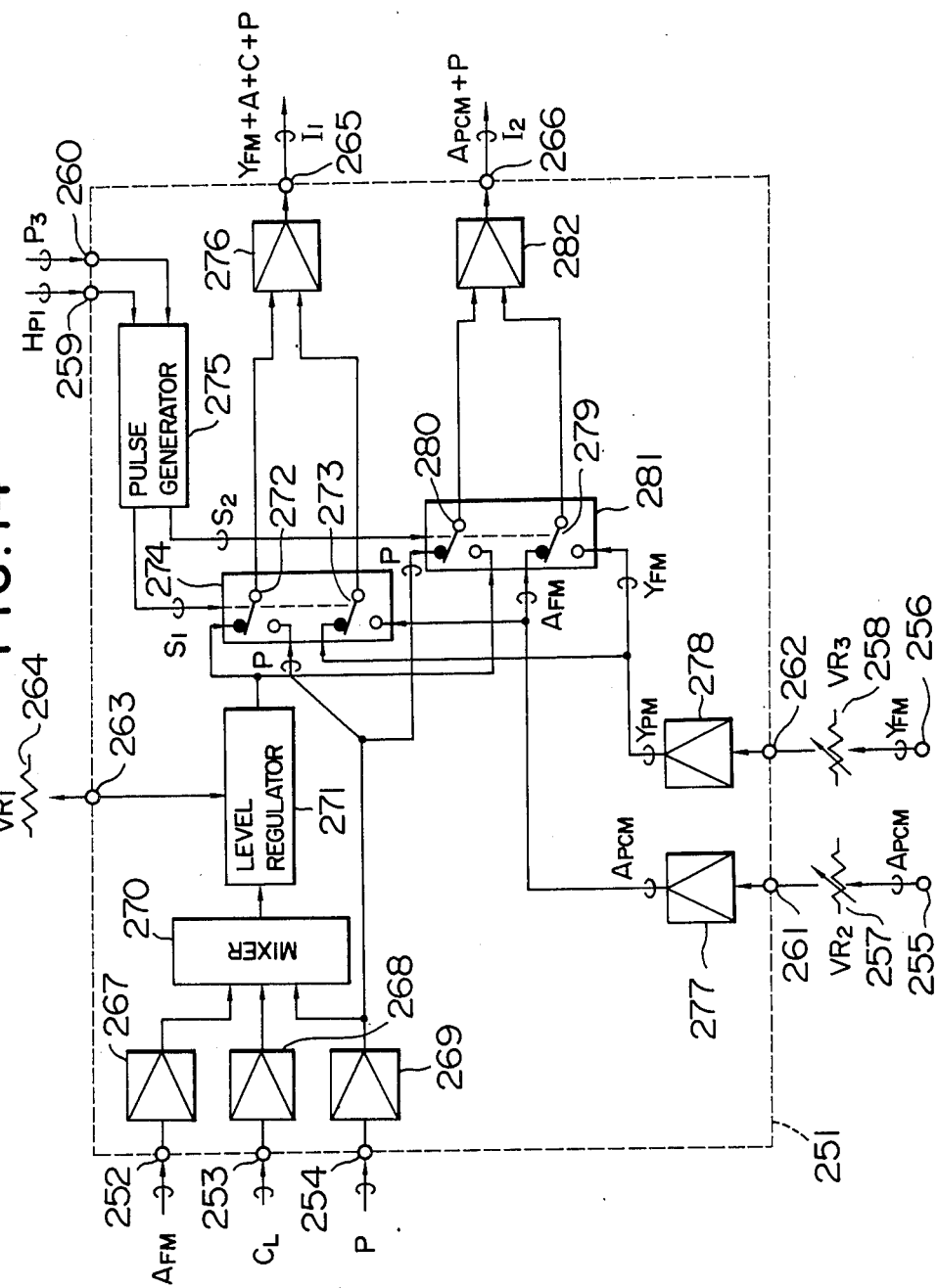
FIG. 14 is a block diagram showing the principal section of the recording circuit of the embodiment shown in FIG. 12.

Referring to FIG. 12, a reference numeral 218 indicates an input terminal of a head switching pulse (HP1 or HP2 of FIG. 13). The head switching pulse HP is a pulse in association with the rotation of the head drum which rotates at the frame frequency and is similar to the pulse signal A already described in the former embodiment. The phase of this pulse HP is synchronized with that of the vertical sync signal $S_v$ of the recording video signal as shown in FIG. 13. A numeral 219 denotes an input terminal of the recording video signal; this video signal is supplied to a luminance signal processor 229, where the luminance signal in the video signal is converted into the FM luminance signal $Y_{FM}$ shown in FIG. 13.

A numeral 230 indicates a recording equalizer for the FM luminance signal to optimize the frequency characteristics of the lower side waves, carriers, and upper side waves of the FM luminance signal.

A numeral 231 represents a chroma processor for picking up the chromaticity signal from the input video signal and converting into the low-frequency color signal $C_L$ ($C_{L1}$ or $C_{L2}$ shown in FIG. 13); 232 is a generator for generating the pilot signal having four different frequencies ($P_1$ or $P_2$ shown in FIG. 13); 220 is an input terminal of the audio signal; and 233 is an audio FM processor to convert the audio signal into the audio FM signal $A_{FM}$ ($A_{FM}$ of FIG. 13).

Numeral 234 is a recording signal processor, and 235 and 236 are write amplifiers, concrete examples of them are shown in FIG. 14. Signal currents $I_1$ and $I_2$ of FIG. 13 are supplied from the write amplifiers 235 and 236 through a rotary transformer 237 to video heads 238 and 239. A block 240 surrounded by the broken line represents a PCM audio signal processing section, and it is convenient to separate this section like an adapter from the VTR. This is because there is an advantage such that the VTR can be commonly manufactured together with lower-cost products excluding this section since even if the recording and reproducing means for the audio PCM signal is omitted, the recording and reproduction are possible as the FM audio signal together with the video signal. Numerals 221 and 222 are input terminals of 2-channel audio signals; 241 is an audio PCM processor to convert the audio signals into the audio PCM signal $A_{PCM}$ ($A_{PCM}$ of FIG. 13); and 242 is a recording equalizer for the audio PCM signal for optimizing the frequency chracteristic to allow the eye pattern to easily open upon reproduction.

Signals reproduced by the video heads 238 and 239 are applied to preamplifier 245 via the rotary transformer 237. The PCM audio signal of reproduced and amplified signals is applied to an audio PCM processor 244 via the equalizer 243 for reproducing. The audio PCM processor 244 demodulates and time-expands the PCM signal, so as to convert the PCM signal into original 24-channel analog signal which is output from the terminals 232 and 224. An audio signal processor 246 demodulates the FM audio signal and outputs it from the terminal 225. The reproduced FM luminance signal $Y_{FM}$ is applied to a luminance signal processor via the equalizer 248 for reproducing. The luminance signal processor 247 demodulates the FM luminance signal and adds the FM luminance signal to the carrier color signal whose carrier frequency is changed back to original frequency prior to the recording by a color signal processor 249 to output the added signal as a color video signal from the output terminal 266. A pilot signal processor 250 picks up the reproduced pilot signal to detect the tracking error, so as to output a tracking control signal from the terminal 227. The tracking control signal is used for a servo system (not shown) for the magnetic tape control.

Next, with respect to the head switching pulse HP, it will be described the selection between the first and second head switching pulses HP1 and HP2 as shown in FIG. 13. As shown in FIG. 12, the head switching pulse HP simultaneously controls the luminance signal processor 229, chroma processor 231, pilot generator 232, audio PCM processor 241, and recording signal processor 234.

The low-frequency color signal and pilot signal will present a problem here. In other words, the low-frequency color signal is switched by the head switching pulse HP so that the frequency has effectively an offset ($\frac{1}{2}$fH in case of NTSC system; $\frac{1}{4}$fH in case of the CCIR system) for every track. For this switching timing, it is necessary to select either of the first and second low-frequency color signals $C_{L1}$ and $C_{L2}$ shown in FIG. 13. With respect to the pilot signal P, it is also necessary to switch the frequency for every track in accordance with the order of $f_1 \rightarrow f_2 \rightarrow f_3 \rightarrow f_4 \rightarrow f_1 \ldots$; this switching operation is done by the head switching pulse HP. For this purpose, with respect to the pilot signal P shown in FIG. 14, it is needed to select either of the first and second pilot signals $P_1$ and $P_2$. The FM luminance signal $Y_{FM}$ is also switched by the head switching pulse HP so that the FM carrier frequency has an effect of $\frac{1}{2}$fH for every track; this switching operation makes no difference by any timings of the first and second head switching pulses HP1 and HP2.

It is a key point how the currents $I_1$ and $I_2$ are generated from the audio PCM signal $A_{PCM}$ and FM luminance signal $Y_{FM}$ of FIG. 13. For this purpose, pulses $S_1$ and $S_2$ shown in FIG. 13 are needed.

As a first method, the head switching pulse HP from the rotary head drum is used as the second head switching pulse HP2; the low-frequency color signal $C_L$ and pilot signal P are switched by this second head switching pulse HP2; the switched low-frequency color signal $C_L$ is used as the second low-frequency color signal $C_{L2}$ shown in FIG. 14; and the pilot signal P is used as the second pilot signal $P_2$. The leading edge of the first pulse $S_1$ is formed by the leading edge of the second head switching pulse HP2, and the trailing edge of the second pulse $S_2$ is formed by the trailing edge of the second head switching pulse HP2 with a some delay time. The leading edge of the second pulse $S_2$ is formed by the trailihg edge of the second head switching pulse HP2, and the trailing edge of the second pulse $S_2$ is formed by the leading edge of the second head switching pulse HP2 with a some delay time. In FIG. 13, the leading phases of the first and second pulses $S_1$ and $S_2$ are at the switching point of the FM luminance signal $Y_{FM}$ and the audio PCM signal $A_{PCM}$; therefore, a proper degree of accuracy is required. On the other hand, the trailing edges are in the overlap section for the compatible margin of the FM luminance signal $Y_{FM}$; accordingly, $\theta_3$ shown in FIG. 11 may be 5° or more and accuracy is not necessary.

To adopt the first method, the head switching pulse HP is merely switched to the first head switching pulse HP1 upon recording and then to the second head switching pulse HP2 upon reproduction. More concretely, the delay amounts of the pulses generated from the head drum are switched in dependence upon the recording and reproduction.

A problem of the first method is that the switching points of the pilot signal P and the low-frequency color signal $C_L$ at the time of recording and reproduction are different. Although there is a slight degradation in performance due to this, this method will be good for an actual use.

A second method is that the second head switching pulse HP2 is first formed from the pulse of the head drum, the second head switching pulse HP2 is delayed by only the time period corresponding to $\theta_4$, and then the first head switching pulse HP1 is generated. The low-frequency color signal $C_L$, pilot signal P and FM luminance signal $Y_{FM}$ are switched by the first head switching pulse HP1, respectively. The audio PCM processor 241 is controlled by any one of the first and second head switching pulses HP1 and HP2. The first and second pulses $S_1$ and $S_2$ may be generated in the same manner as the first method.

In case of this second method, such a problem with the first method will not be caused that the switching points of the low-frequency color signal $C_L$ and pilot signal P are different upon recording and reproduction.

As a third method, only the first head switching pulse HP1 is used as the head switch pulse HP, and a pulse $P_3$ shown in FIG. 13 is output from the audio PCM processor 241. The pulse $P_3$ is such a pulse that rises at the beginning of the audio PCM signal $A_{PCM}$ and falls at the point ($b_0$) where the audio PCM signal $A_{PCM}$ and FM luminance signal $Y_{FM}$ are switched. Consequently, the first pulse $S_1$ rises at the trailing edge of the pulse $S_3$ and the first head switching pulse HP1 may fall with a some delay time; the second pulse $S_2$ can be similarly generated. Each of the FM luminance signal $Y_{FM}$, low-frequency color signal $C_L$ and pilot signal P is, of course, switched by the first head switching pulse HP1. Although the third method has no problem on performance, it has a drawback such that the communications of the signal, i.e. pulse $P_3$, between the PCM adapter 240 and the VTR side increase.

A fourth method is that the pulse corresponding to the pulse $P_3$ is produced by detecting the amplitude of the audio PCM signal. As described previously, accuracy is needed with respect to the timing corresponding to the trailing edge of the pulse $P_3$ of the pulse thus produced by the detection. Therefore, it is necessary to correctly set the length ($\theta_5$ of FIG. 13) of the postamble and the data of the audio PCM signal $A_{PCM}$ to the specified values.

If this fourth method is not adopted, the length of the postamble may be set to a specified value or more.

Next, the operation of the circuit shown in FIG. 14 will be described. A section 251 surrounded by the broken line represents an IC in which the recording signal processor 234 and write amplifiers 235 and 236 have been conjointly integrated, wherein reference numerals 252, 253, 254, 261, 262, 259, 260, 263, 265, and 266 show input/output terminals of the IC. It is a key point in the circuit arrangement of FIG. 14 to reduce the input/output terminals of the IC.

A numeral 257 is a recording current setting device of the audio PCM signal; 258 is a recording current setting device of the FM luminance signal; 264 is a regulator for conjointly setting the recording currents of the audio FM, low-frequency color, and pilot signals. One feature of the arrangement of FIG. 14 is to secure the proper range of characteristics by means of the minimum number of regulators.

Referring to FIG. 14, numeral 252 is the input terminal of the audio FM signal, which is an output of the audio FM processor 233 of FIG. 12; 253 is the input terminal of the low-frequency color signal, which is an output of the color signal processor 231; 254 is the input terminal of the pilot signal, which is an output of the pilot signal generator 232; 255 is an input terminal of the audio PCM signal, which is an output of the recording equalizer 242; 256 is an input terminal of the FM luminance signal, which is an output of the recording equalizer 230; 259 is the input terminal of the first head switching pulse HP1 signal from the input terminal 218; 260 is the input terminal of the pulse signal P3, which is an output of the audio PCM processor 241; 261 is the input terminal of the audio PCM signal; 262 is the input terminal of the FM luminance signal; 263 is the level regulating terminal of the audio FM signal, low-frequency color signal and pilot signal; 265 is the output terminal of the current $I_1$, from which the recording current is supplied to the video head 238; and 266 is the output terminal of the current $I_2$, from which the current $I_2$ is supplied to the video head 239.

Numerals 267, 268, 269, 277, 278 are buffer amplifiers; 270 is a mixer for mixing three signals of the audio FM signal, low-frequency color signal, and pilot signal; 271 is a level regulator; 272, 273, 279, and 280 are switches; 274 is an interlocking switch consisting of the switches 272 and 273; 281 is an interlocking switch consisting of the switches 279 and 280; 275 is a pulse generator for outputting the first and second pulses $S_1$ and $S_2$; and 276 and 282 are output amplifiers.

In the period when the first pulse $S_1$ is High, the switches 272 and 273 are connected to the upper contacts (black dots); while, they are connected to the lower contacts (white dots) in the period when the first pulse $S_1$ is Low. The relationships between the second pulse $S_2$ and the switches 279 and 280 are similar to the above.

The simplification of the circuit arrangement and the reduction of the number of terminals of the IC are accomplished by such means that: the audio FM signal, low-frequency color signal and pilot signal in the video track, where recording levels are severe, are regulated, while the pilot signal in the overlap track, where the recording level is not so severe, is not regulated; the level regulators for the audio FM signal, low-frequency color signal and pilot signal are provided on the input sides of the switches 274 and 281 and on the output side of the mixer 270; and the recording current setting circuits 257 and 258 are likewise provided on the input sides of the switches 274 and 281.

Figure 15:
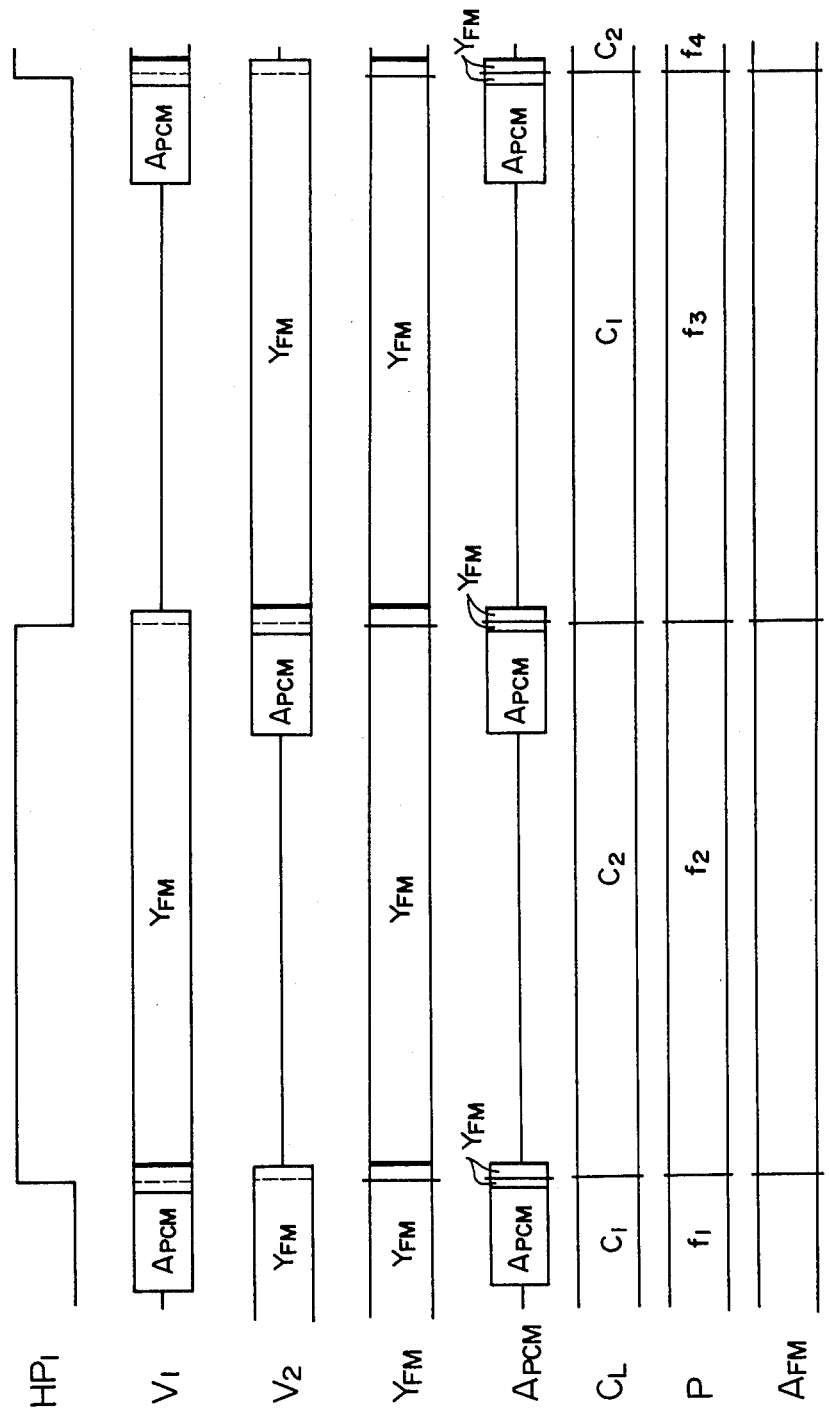
FIG. 15 shows timing charts to describe the operation of the reproduction circuit shown in FIG. 12.
Figure 16:
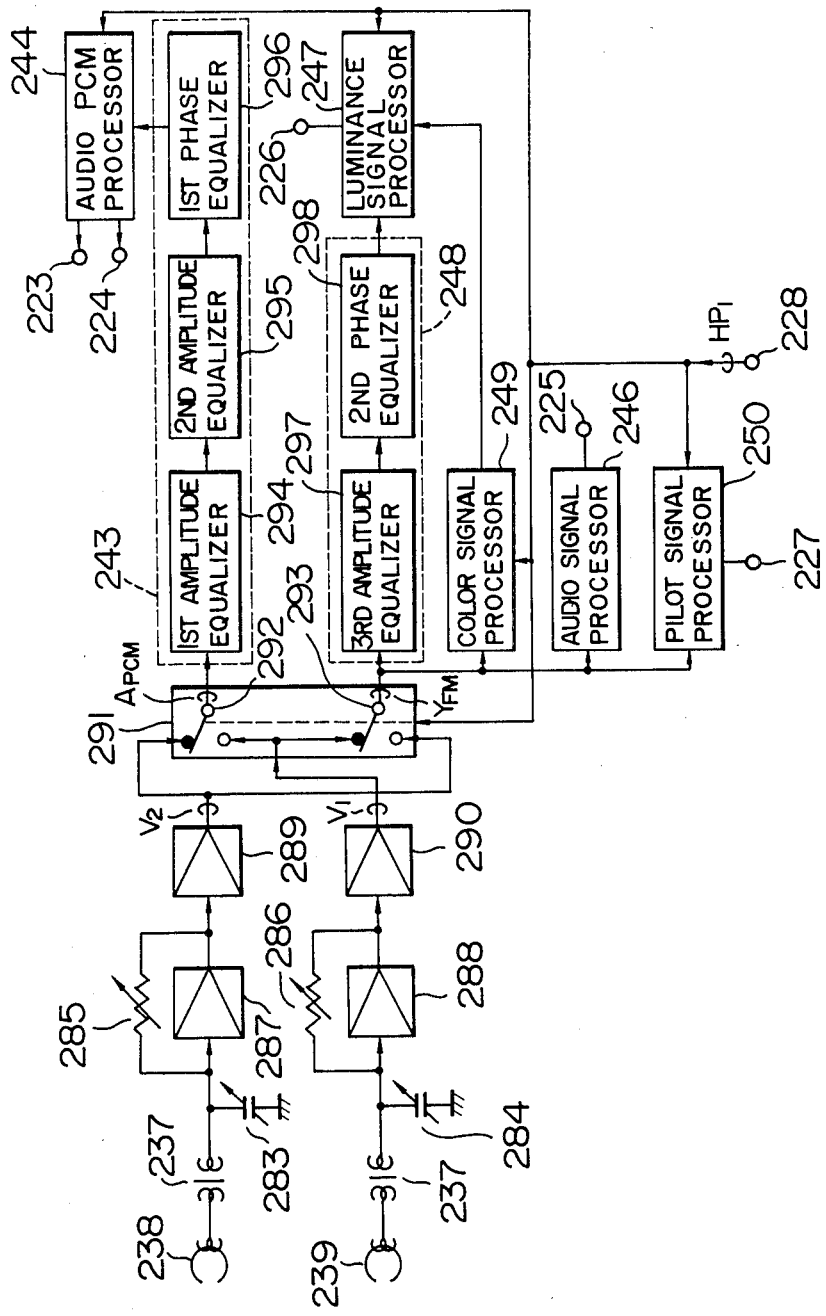
FIG. 16 is a block diagram showing a concrete example of the reproduction circuit.

The operation upon reproduction will now be described. FIG. 15 is a waveform diagram showing the timing charts of the waveforms in each section of the reproduction circuit according to the present invention. FIG. 16 is a block diagram as one concrete embodiment of the reproduction circuit of the present invention. FIGS. 17, 18, 19, and 20 are graphs showing the frequency characteristics in each section of the circuit shown in FIG. 16.

Figure 17:
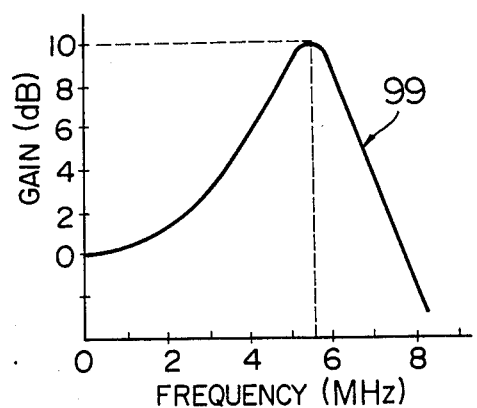
FIGS. 17 to 20 are graphs showing the frequency characteristics in each section of the circuit shown in FIG. 16.

The operation of the circuit of FIG. 16 is first described. In the drawing, numerals 283 and 284 denote trimmer capacitors to adjust the resonance frequency of a head peaking circuit; 285 and 286 are volumes to adjust the dumping characteristic of the head peaking circuit; 287 and 288 are head amplifiers; 289 and 290 are buffer amplifiers, wherein the frequency characteristics from the video heads 238 and 239 to the buffer amplifiers 289 and 290 (excluding the characteristics of the tape and head systems) are selected as shown in FIG. 17. It is desirable to select the characteristics that are required for both FM luminance and audio PCM signals with respect to the amplitude equalization characteristic 99 of FIG. 17.

An output signal $V_2$ of FIG. 15 is output as an output of the buffer amplifier 289, and an output signal $V_1$ is output as an output of the buffer amplifier 290, respectively. An interlocking switch 291 consisting of switches 292 and 293 is controlled by the first head switching pulse HP1 of FIG. 15 from a terminal 228. These switches are connected to the upper contacts (black dots) in the period when the first head switching pulse HP1 is High, while they are connected to the lower contacts (white dots) in the period when HP1 is Low. The audio PCM signal $A_{PCM}$ of FIG. 15 is output from the switch 292, and the FM luminance signal $Y_{FM}$ of FIG. 15 is output from the switch 293, respectively.

Figure 18:
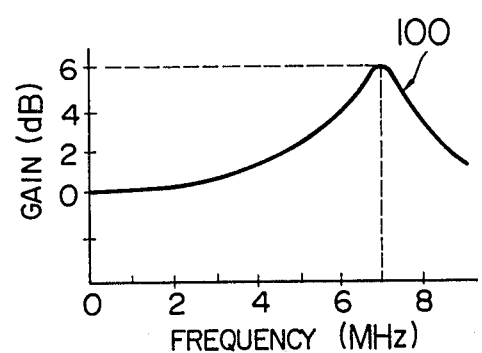
Figure 19:
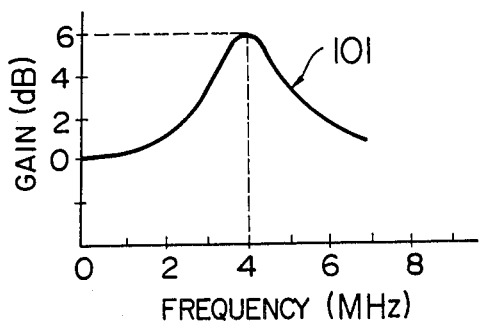

An equalizer 243 comprises a first amplitude equalizer 294, a second amplitude equalizer 295, and a first phase equalizer 296. An example of the characteristic of the first amplitude equalizer 294 is shown at 100 in FIG. 18, and an example of the characteristic of the second amplitude equalizer 295 is shown at 101 in FIG. 19. An equalizer 248 comprises a third amplitude equalizer 297 and a second phase equalizer 298. An example of the characteristic of the third amplitude equalizer 297 is shown at 101 in FIG. 19. The amplitude equalization characteristics necessary for the FM luminance and audio PCM signals should be made different. That is to say, the equalization characteristic for the FM luminance signal is determined for the purpose of prevention of inversion and assurance of adequate S/N ratio. On the other hand, the equalization characteristic of the audio PCM signal is determined on the basis of opening ratio of the eye pattern. In concrete, the lower side waves of the FM luminance signal are slightly emphasized, while the amplitude characteristics including the tape and head systems for the audio PCM signal are smoothed. For this purpose, the peaking frequency of FIG. 19 is selected to be lower than that of FIG. 17, while the peaking frequency of FIG. 18 is selected to be higher than that of FIG. 17.

Although the first amplitude equalizer 294 in FIG. 16 is inevitable, the second amplitude equalizer 295 may be omitted. The characteristic of the first phase equalizer 296 is selected such that the group delay characteristics of the recording and reproducing systems including the tape and head systems are smoothed. The characteristic of the second phase equalizer 298 is determined in consideration of both inconspicuousness of the noise in the picture contour section and the matching of the timings of the luminance and chromaticity signals. This characteristic is preferably selected to be shorter than the group delay time of the first phase equalizer 296.

Figure 20:
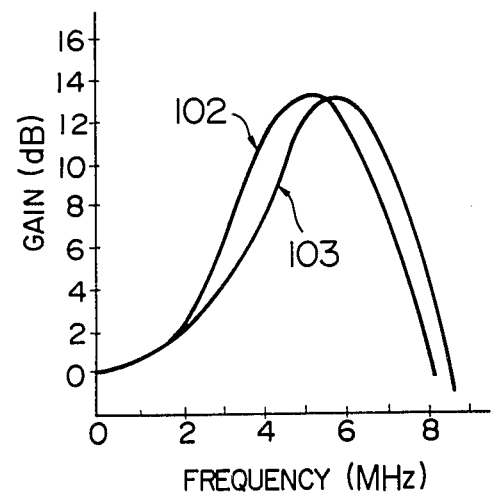

FIG. 20 shows an example of the amplitude characteristic of the reproduction circuit, in which a reference numeral 102 denotes a characteristic of the circuit system from the video head to an output of the equalizer 248, and 103 represents a characteristic of the circuit system from the video head to an output of the equalizer 243.

Figure 21:
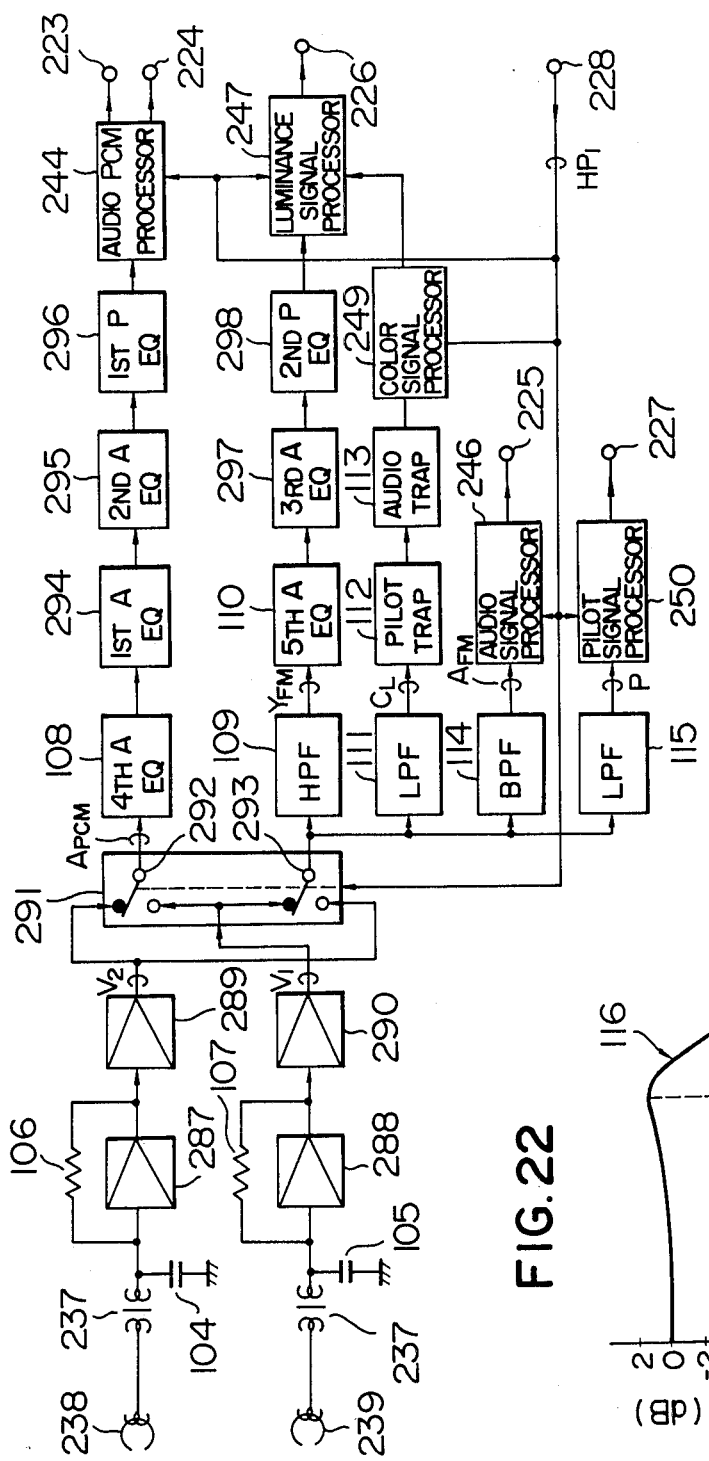
FIG. 21 is a block diagram showing another embodiment of the reproduction circuit according to the present invention.
Figure 22:
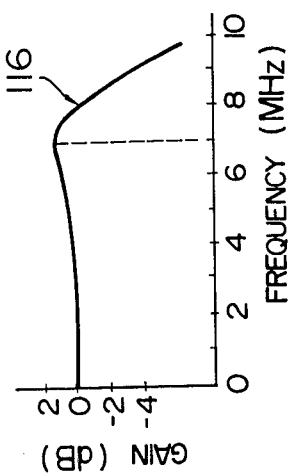
FIG. 22 is a graph showing the partial frequency characteristic of the circuit shown in FIG. 21.

Another embodiment of the reproduction circuit shown in FIG. 21 will now be described. FIG. 21 is different from FIG. 16 with respect to the parts numbered at reference numerals 104 to 115. Numerals 104 and 105 are fixed capacitors to determine the resonance frequency of the head peaking circuit, and the resonance frequency is preset at the design process to about 6-7 MHz. Numerals 106 and 107 are dumping resistors. An example of the amplitude characteristics from the video heads 238 and 239 to the buffer amplifiers 289 and 290 is shown by a characteristic 116 in FIG. 22. A feature of the characteristic 116 is that the amplitude is substantially flat until about 6 MHz. To obtain this flatness, the resonance frequency is set to be slightly high and an adequate feedback dumping is applied.

The merits according to the above method are that: the amplitude characteristics of the circuit systems from the head 238 to the buffer amplifier 289 and from the head 239 to the buffer amplifier 290 can be aligned without regulating them; four trimmers (trimmer capacitors 283 and 284, and variable resistors 285 and 286) are not required; and the amplitude equalization characteristics that are respectively suitable for the FM luminance and audio PCM signals can be easily designed at the rear stage. The characteristics of a fourth and a fifth amplitude equalizers 108 and 110 may be set to be similar to a characteristic numbered at 99 in FIG. 18. A reference numeral 109 indicates a HPF for eliminating the low-frequency color signal; 111 is an LPF for eliminating the FM luminance signal; 112 is a trap for eliminating the pilot signal; 113 is a trap for eliminating the audio FM signal; 114 is a BPF for extracting the FM audio signal; and 115 is an LPF for extracting the pilot signal.

Figure 23:
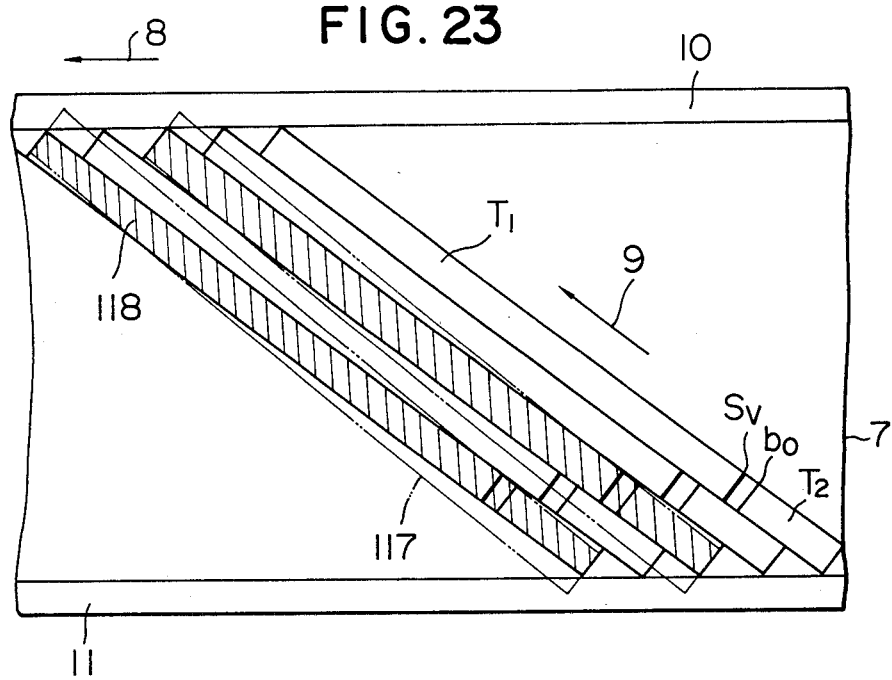
FIG. 23 illustrates a pattern diagram to describe the operation to reproduce the recording tape at a speed which is twice the speed upon recording according to the present invention.

Next, the double speed playback will be described with reference to FIG. 23 whereby the tape having the recording pattern shown in FIG. 11 is played back at a speed which is twice the speed upon recording. In FIG. 23, a reference numeral 117 denotes a trace pattern by two video heads having equal azimuth angles, this pattern has a track width which is 1.5 times the track pitch. A track 118 shown by hatching represents a track section to be reproduced. It can be seen from FIG. 23 that the video track $T_1$ and overlap track $T_2$ are reproduced on alternate lines. As result, half of the frames of picture images are thinned out for time laps and advances double speed, thereby providing relatively clear pictures and a rapid flow of sound voices with a normal pitch. Consequently, news or drama can be played back at a speed twice the normal, this will contribute to the saving of time for the user.

Figure 24:
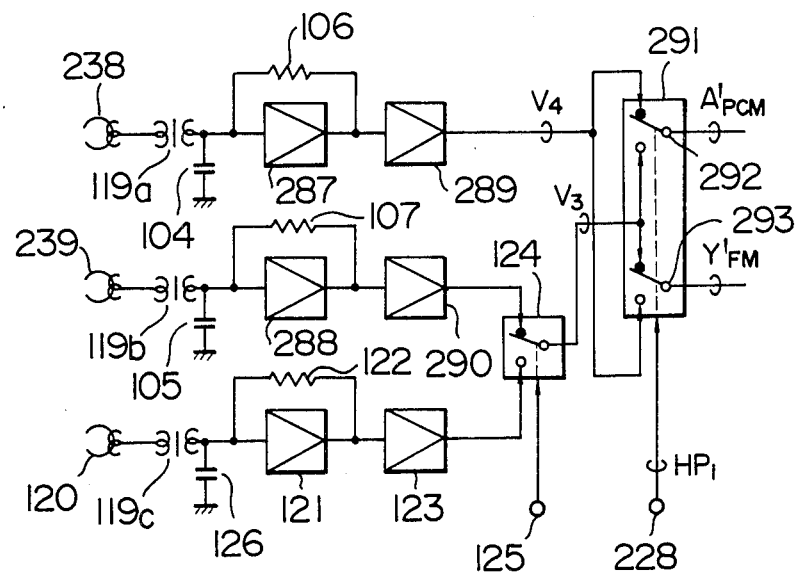
FIG. 24 is a block diagram showing an example of the reproduction circuit for performing the operation shown in FIG. 23.
Figure 25:
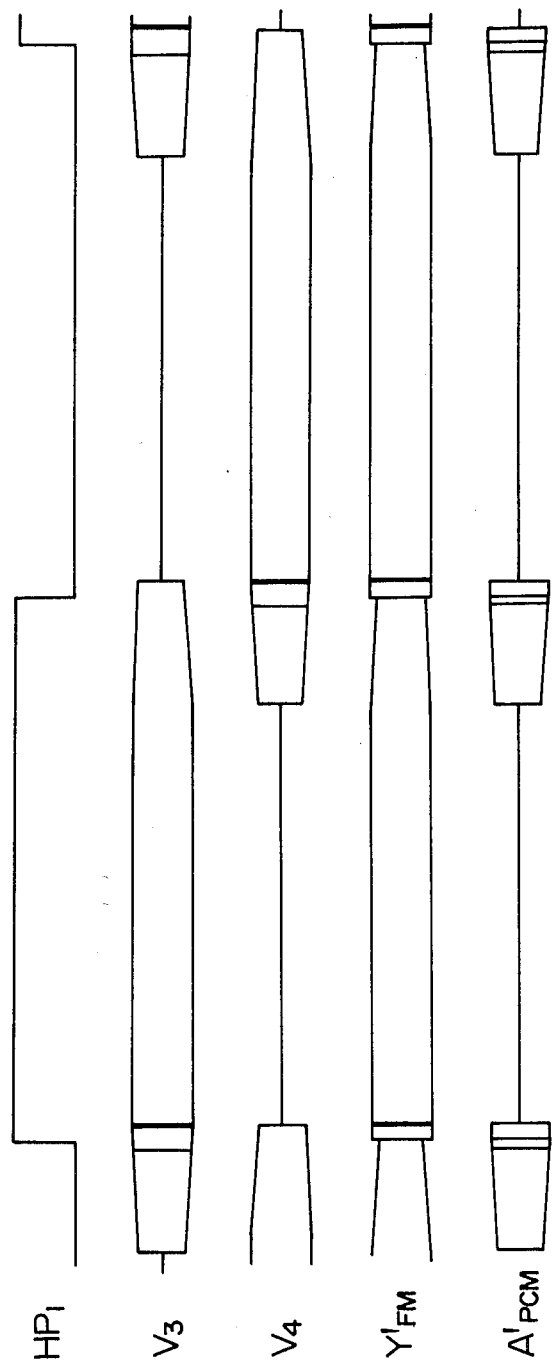
FIG. 25 shows signal waveform diagrams in each section of the circuit shown in FIG. 24.

FIG. 24 is a block diagram showing an example of application of the present invention which enables the reproduction shown in FIG. 23. FIG. 25 is a diagram showing the signal waveforms in each section of the circuit shown in FIG. 24.

In FIG. 24, numerals 119a, 119b and 119c are 3-channel rotary transformers; 120 is a video head having the same azimuth angle as that of the head 238, this video head 120 will be used for only the double-speed playback; 121 is a head amplifier; 122 is a dumping resistor; 123 is a buffer amplifier; 125 is a control signal input terminal to switch between the normal reproduction and the double-speed reproduction; 124 is a switch which is connected to the upper contact (black dot) in the normal playback mode and is connected to the lower contact (white dot) in the double-speed playback mode, and a signal $V_3$ of FIG. 25 is derived at an output of this switch 124.

In FIG. 24, when the azimuth angle between the video heads 238 and 120 is set to $+10°$ and the azimuth angle of the video head 239 is set to $-10°$ and the track widths of the video heads 238, 239 and 120 are set to be 1.5 times the track pitch, it is possible to obtain almost perfect signals as outputs of the amplifiers 289 and 123 in the double-speed playback mode, although the levels of those signals in the sections of the incoming and outgoing sides of the tape slightly drop as shown by output signals $V_4$ and $V_3$ in FIG. 25. Therefore, two output signals of the switch 291 for separating the FM luminance signal $Y'_{FM}$ and audio PCM signal $A'_{PCM}$ will be substantially as perfect as the FM luminance signal $Y'_{FM}$ and audio PCM signal $A'_{PCM}$. In this way, by providing the the switch 124 on the input side of the switch 291, both FM luminance and audio PCM signals can be simultaneously improved in the double-speed playback mode.

Although the circuit shown in FIG. 21 has been arranged for three channels in the embodiment shown in FIG. 24, the circuit shown in FIG. 16 can be also arranged for three channels in the same method.

Next, the embodiment will be described whereby various kinds of tapes having different characteristics can be used with respect to the characteristic of the magnetic tape 7 to be used for such recording and reproduction as described above. To improve the recording density, it is considered to use a metal powder tape or metal evaporated tape in place of a conventional tape using ferromagnetic oxides. Since each of these tapes has a different optimum recording signal level and equalization characteristic, it is necessary to switch the characteristics of the recording and reproducing circuit in accordance with the kinds of tapes to be used.

Namely, in case of the saturation recording with the metal powder tape, the level of the optimum recording current against the signal to be recorded is 2–3 dB higher than that of the metal evaporated tape. On the other hand, in case of the bias recording, the level of the optimum recording current against the signal to be recorded is contrarily 1–2 dB lower than that of the metal evaporated tape. Furthermore, the emphasizing effect of the lower side waves with the metal evaporated tape is smaller than that of the metal powder tape; thus, the compensation for this is considered to be necessary.

This is assumed from the facts that a thickness of the magnetic layer of the metal powder tape is 3–6 μm while that of the metal evaporated tape is about 0.1 μm, and that the $H_c$ of those tapes are about 1300 and about 900. The same result as the above content was obtained from the actual experiments using ferrite heads and Sendust bulk head.

Now, this Sendust sheets each having a thickness of 5–10 μm were formed by a sputter to obtain the optimum recording conditions of the metal powder tape and metal evaporated tape using the video heads formed by laminating these Sendust sheets. The optimum recording current for the metal powder tape was obtained with respect to the signal to be saturation recorded, and this optimum recording current was used for the metal evaporated tape. As a result, it has been found that the deterioration of C/N (carrier to noise ratio) was hardly caused and that the emphasizing effect of the lower side waves of the metal evaporated tape is extremely analogous to that of the metal powder tape. Although the optimum recording current for the actual metal evaporated tape is 1–2 dB lower than that for the metal powder tape, even if the current exceeds 1–2 dB over, the deterioration of C/N (carrier/noise) will be hardly caused. To the contrary, in case of the frequency modulated luminance signal, the energy of the lower side waves is advantageously emphasized, so that its characteristic will be similar to that of the metal powder tape. On the other hand, for the signal to be bias recorded, the recording current can be largely set and the playback level when the metal evaporated tape was played back can be enlarged. Thereby reducing the difference between the playback levels of the metal evaporated tape and metal powder tape.

Figure 26:
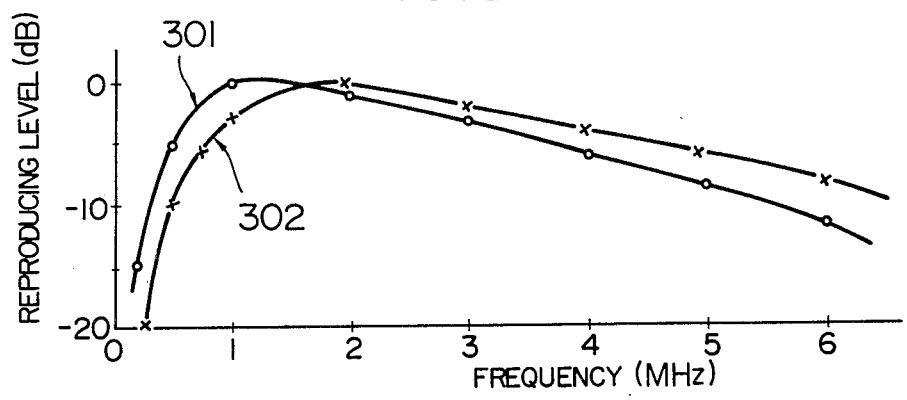
FIG. 26 shows graphs of the frequency characteristics to indicate the difference between the reproduction signal levels due to the difference of the kinds of tapes used.

One embodiment based on such concept will be described with reference to the drawings. FIG. 26 is a diagram showing the frequency characteristics when the metal powder tape and metal evaporated tape which are used in the present invention were recorded and reproduced using the Sendust sputter heads. In FIG. 26, a numeral 301 shows a characteristic of the metal powder tape; 302 is a characteristic of the metal evaporated tape. It can be seen from FIG. 26 that the playback level of the metal powder tape is higher in the frequencies below 2 MHz and the playback level of the metal evaporated tape is higher in the frequencies above 2 MHz.

Figure 27:
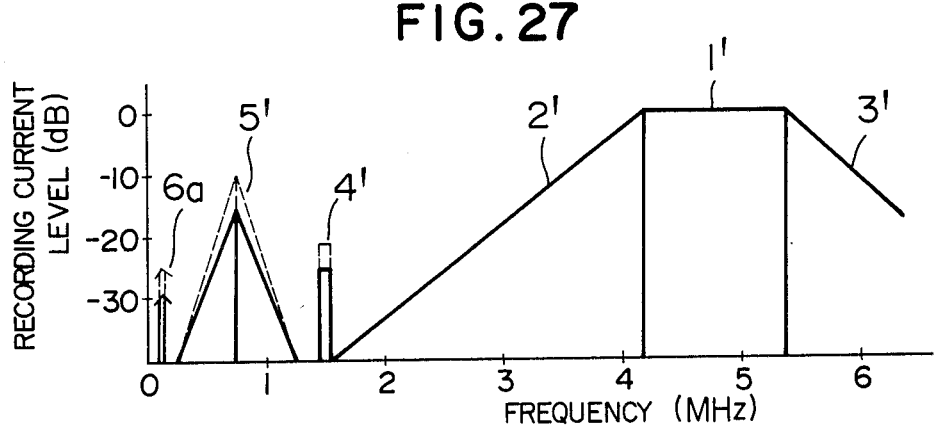
FIGS. 27 and 28 show examples of the spectra of the recording signal in case of changing the recording level in dependence upon the kinds of tapes.

FIG. 27 is a diagram showing one example of the output signal spectrum of the recording circuit in the present embodiment. This diagram shows the signal to be recorded in the video track 14 or $T_1$ shown in FIG. 3 or 11, wherein the line indicated by the solid line represents the recording current level for the metal powder tape, and the line indicated by the broken line represents the recording current level for the metal evaporated tape. In FIG. 27, a reference numeral 6a denotes a pilot signal and the recording level is set to −29 dB for the metal powder tape and to about −25 dB for the metal evaporated tape on the assumption that the carrier level of the frequency modulated luminance signal $Y_{FM}$ is 0 dB. The recording level of a low-frequency converted chroma signal $C_L$ 5' is selected to −14 dB for the metal powder tape and to −10 dB for the metal evaporated tape. The recording level of a frequency modulated audio signal $A_{FM}$ 4' is selected to −25 dB for the metal powder tape and to −21 dB for the metal evaporated tape.

The recording levels of a carrier 1', lower side band waves 2' and upper side band waves 3' of the FM luminance signal $Y_{FM}$ are 0 dB in the section of the carrier 1' and are selected to be identical for both metal powder and metal evaporated tapes.

Figure 28:
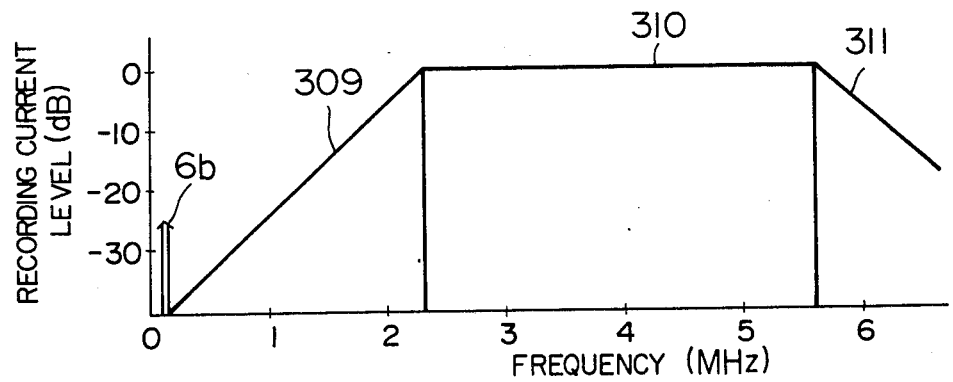

FIG. 28 also is a diagram showing one example of the output spectrum of the recording circuit in the present embodiment, this diagram shows the signal to be recorded in the overlap track 13 or $T_2$ shown in FIG. 3 or 11. The recording level of a pilot signal 6b is selected to −25 dB and the recording levels for both metal powder and metal evaporated tapes are selected to be identical. A numeral 309 indicates lower side band waves of the audio signal $A_{PCM}$ which was converted into the PCM signal; 310 is a carrier of the $A_{PCM}$; 311 is upper side band waves of the $A_{PCM}$, wherein the recording levels of both metal powder and metal evaporated tapes are selected to be equivalently 0 dB.

Figure 29:
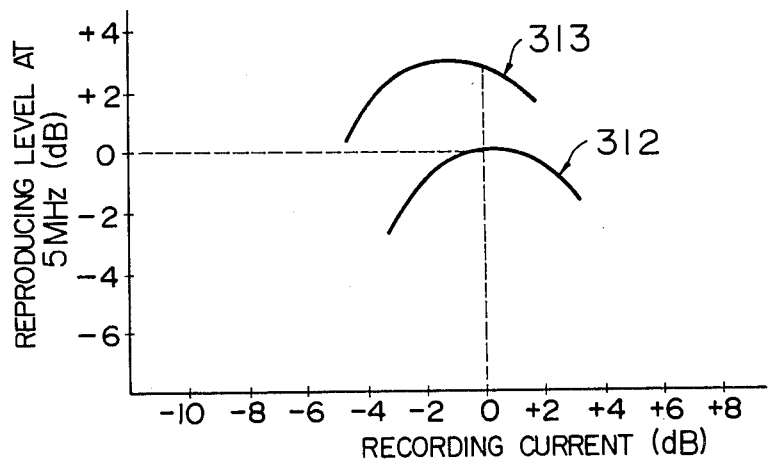
FIG. 29 is a characteristic diagram showing the change of reproduction level for the magnitude of recording current.

FIG. 29 is a diagram showing the relationship between the recording current and the playback level at 5 MHz, wherein a curve 312 represents a characteristic of the metal powder tape, and a curve 313 represents a characteristic of the metal evaporated tape. The level of the optimum recording current of the metal evaporated tape is about 2 dB lower than that of the metal powder tape. However, even if the recording is performed in the metal evaporated tape using the optimum current of the metal powder tape, the deterioration of the playback level will be not larger than 0.5 dB, this may be permissive.

Figure 30:
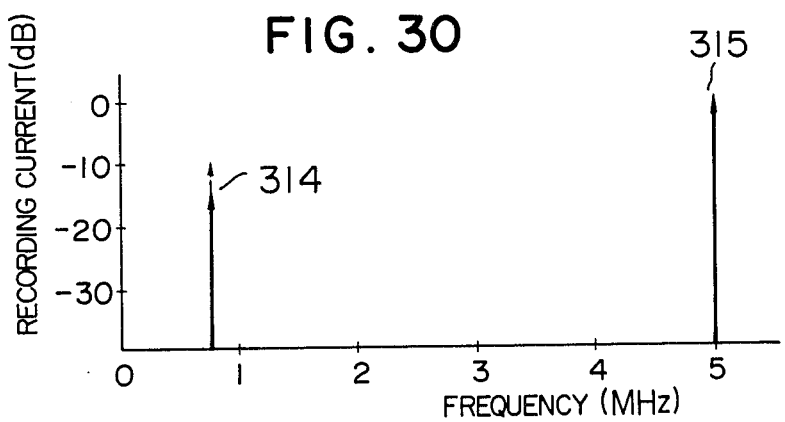
FIGS. 30 and 31 are a diagram of the recording signal spectrum and a diagram of the reproduction signal spectrum to describe the cross modulation characteristics of the tape head system.
Figure 31:
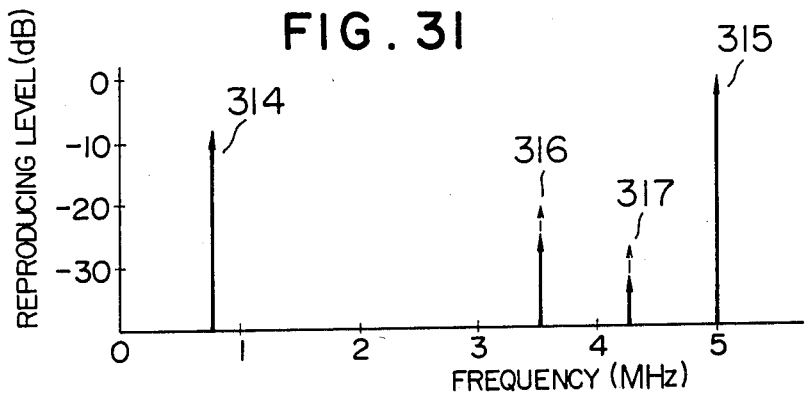

FIGS. 30 and 31 show cross modulation characteristics of the tape head system. FIG. 30 shows the recording spectrum diagram and FIG. 31 shows the spectrum diagram of the reproduction signal, wherein each solid line indicates the level of the metal powder tape and each broken line indicates the level of the metal evaporated tape. In FIGS. 30 and 31, a reference numeral 314 is a carrier of the CL signal; 315 is a carrier of the $Y_{FM}$ signal; 316 is a spurious having the frequency of $(Y_{FM}-2C_L)$; and 317 is a spurious having the frequency of $(Y_{FM}-C_L)$.

If the recording level of the $Y_{FM}$ signal carrier 315 is selected to be the optimum recording current of the metal powder tape, when the playback level of the $Y_{FM}$ signal carrier for the metal powder tape is 0 dB, the playback level for the metal evaporated tape will be about +3 dB.

It is more preferable that the recording level of the $C_L$ signal carrier 314 is as high as possible in a range where the spurious signals 316 and 317 are not larger than permissive values. In FIG. 30, the recording level of $C_L$ of the metal powder tape is set to −14 dB, while that of the metal evaporated tape is set to −10 dB. The playback level of $C_L$ is almost equal to that as shown in FIG. 31 regardless of the kinds of tapes. The spurious level of the metal evaporated tape is about +3 dB higher than that of the metal powder tape.

In this state, the spurious characteristics between them are substantially equivalent since the permissive value of the spurious is determined by the relative value with the carrier level of the $Y_{FM}$ signal.

If the recording level of $Y_{FM}$ of the metal evaporated tape is selected to be the optimum recording current of the metal evaporated tape, it will be necessary to set the recording level of $C_L$ to $-12$ dB in order to make the spurious signals 316 and 317 equivalent to those of FIG. 31. At this time, the playback level of $C_L$ is 2 dB lower than that of the metal powder tape. As described above, by selecting the $Y_{FM}$ recording current of the metal evaporated tape to be the optimum recording current of the metal powder tape, the playback levels of the $C_L$, $A_{FM}$ and pilot signals to be bias recorded can be advantageously improved.

As shown in FIG. 26, there may be a difference between the frequency characteristics of the metal powder and metal evaporated tapes. If the $Y_{FM}$ signal is recorded by the optimum recording currents of the respective tapes, this difference will not affect the playback picture quality by the metal powder tape; however, the playback picture quality by the metal evaporated tape will be indistinct because of lack of resolution. On the contrary, in the case where the signal is recorded on both tapes by the optimum recording current of the metal powder tape, the playback picture quality by the metal evaporated tape is similar to that by the metal powder tape, this will be no problem. This is cause the enlargement of the recording current by about 2 dB corresponds to that the lower side band waves have been emphasized and recorded. Therefore, from this point, it is desirable not to switch the recording current of $Y_{FM}$ by the tapes.

Figure 32:
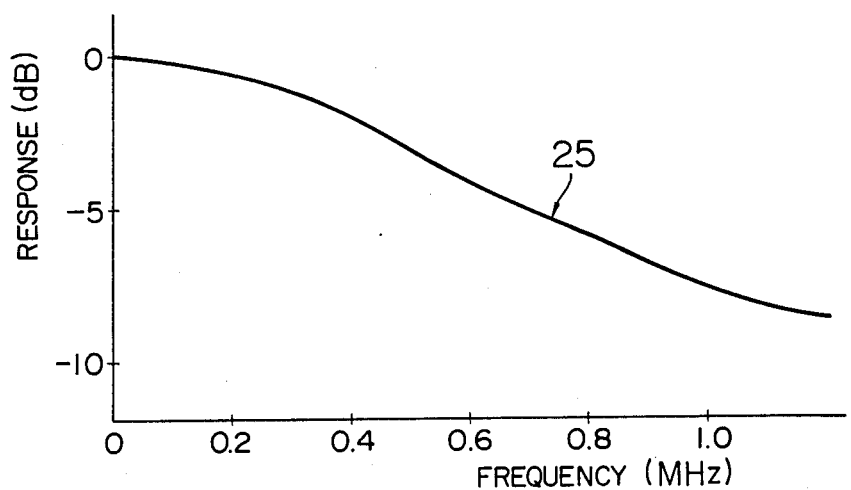
FIG. 32 is a frequency characteristic diagram showing an example of the characteristic of the recording equalizer which is used in one embodiment of the present invention; .
Figure 33:
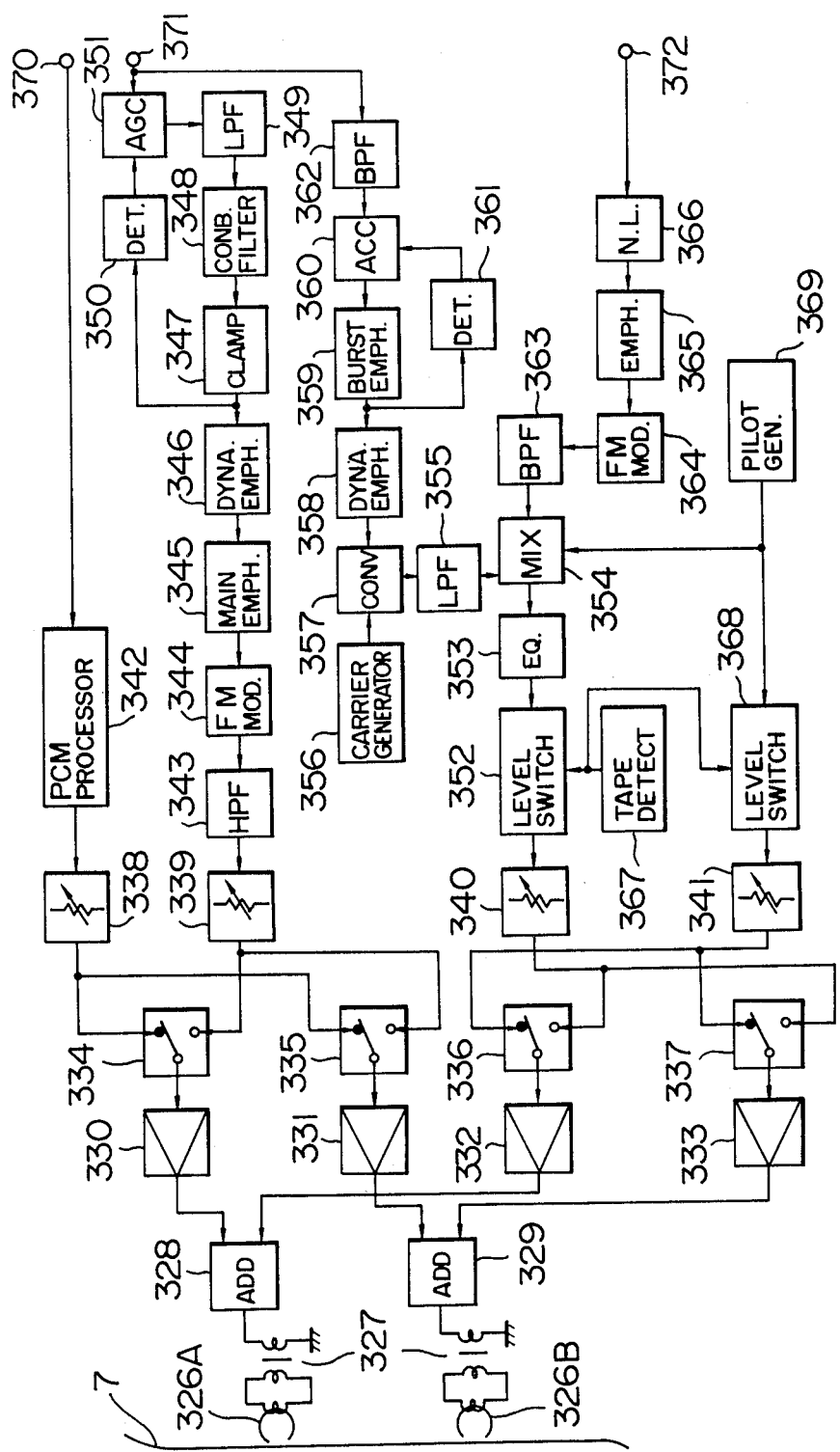
FIG. 33 is a block diagram showing one embodiment of the recording circuit as an example of changing the recording level in accordance with the kinds of tapes.

FIG. 32 is a diagram showing an example of the frequency characteristic of the recording equalizer to be used in the present embodiment. FIG. 33 is a block diagram as one embodiment of the recording circuit to realize the above-described operation.

In FIG. 33, a numeral 370 is an input terminal of the audio signal; 342 is a circuit for converting an analog audio signal into a PCM signal and for time compressing into 1/6-⅛; 338 is a circuit for setting the recording current of $A_{PCM}$; 371 is an input terminal of a video signal; 351 is an AGC (automatic gain control) for controlling the luminance signal level to a constant value; 349 is an LPF for extracting the luminance signal; 348 is a comb filter for eliminating the color subcarrier of the NTSC system; 347 is a clamping circuit for fixing a synchronous peak voltage to a constant value; 346 is a dynamic emphasis circuit; 345 is a main emphasis circuit; 344 is a frequency modulator; 343 is a HPF; 339 is a recording current setting circuit of $Y_{FM}$; 362 is a BPF for extracting the chroma signal; 360 is an ACC (automatic color control) for controlling the burst level so that it is maintained to be a constant value; 359 is a circuit for boosting only the burst level by 6 dB; 358 is a dynamic emphasis circuit; 357 is a frequency modulator; and 356 is a carrier generator for generating the frequencies of $\{(47+\frac{1}{8})f_H+f_{sc}\}$ and $\{(47-\frac{1}{8})f_H+f_{sc}\}$. (wherein, $f_{sc}$ is a color subcarrier frequency.) Numeral 355 is an LPF; 372 is an input terminal of the audio signal; 366 is a non-linear circuit; 365 is an emphasis circuit; 364 is a frequency modulator; 369 is a pilot signal generator; 354 is a mixer; 353 is a recording equalizer, whose characteristic is, for example, as shown in FIG. 32. Numerals 352 and 368 are recording level switching circuits; 367 is a detecting device for detecting the kinds of tapes; 340 and 341 are recording current level setting circuits; and 334, 335, 336, and 337 are signal switching circuits, wherein each of these switches is connected to the upper side (black dot) when video heads 326A and 326B record in the overlap track, and is connected to the lower side (white dot) when they record in the video track. These switching operations are controlled by the same means as that in the embodiment shown in FIG. 4.

Numerals 330, 331, 332, and 333 are buffer amplifiers having flat amplitude characteristics; 328 and 329 are write amplifiers having flat amplitude characteristics; 327 is a rotary transformer; and 326A and 326B are the video heads. A numeral 350 indicates a detector for detecting the amplitude of the luminance signal.

Although the device 367 for detecting the kinds of tapes is not shown, it can be realized by the following method: for example, projections of holes are preliminarily formed in the fixed positions of the cassette in accordance with the kinds of tapes; levers adapted to come into engagement with these projections or holes when the cassette is loaded are provided in a video tape recorder; thereby making the corresponding switch operative in response to the motion of the lever in dependence upon the presence and absence of the projections or holes.

One feature of the embodiment shown in FIG. 33 is that the recording level switching circuit 352 is provided on the output side of the mixer 354. Due to this, the recording level switching circuit 352 can be remarkably simply constructed.

Figure 34:
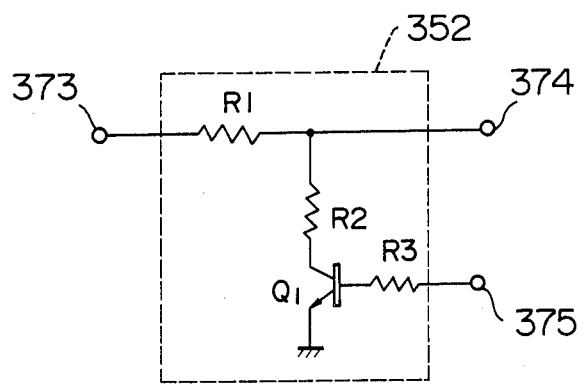
FIG. 34 is a circuit diagram as one concrete example of the recording level switching circuit which is used in the embodiment shown in FIG. 33.

FIG. 34 shows an example of the concrete construction of the recording level switching circuit 352. In FIG. 34, a numeral 373 is an input terminal; 374 is an output terminal; and 375 is a control terminal, whereby a transistor $Q_1$ is turned on when recording in the metal powder tape, and the transistor $Q_1$ is turned off when recording in the metal evaporated tape. The characteristic of FIG. 27 is obtained by setting 20 log $$\left(\frac{R_2}{R_1+R_2}\right)$$

to $-4$ dB.

Another feature of the embodiment shown in FIG. 33 is concerned with the installing position of the recording equalizer 353. Although the recording equalizer 353 is necessary for the $C_L$ signal, which is an output signal of the LPF 355, the $A_{FM}$ and pilot signals may be also equalized. In such a case, since the equalization circuit acts to suppress the harmonic spurious, it is unnecessary to separately provide a spurious suppression filter.

Figure 35:
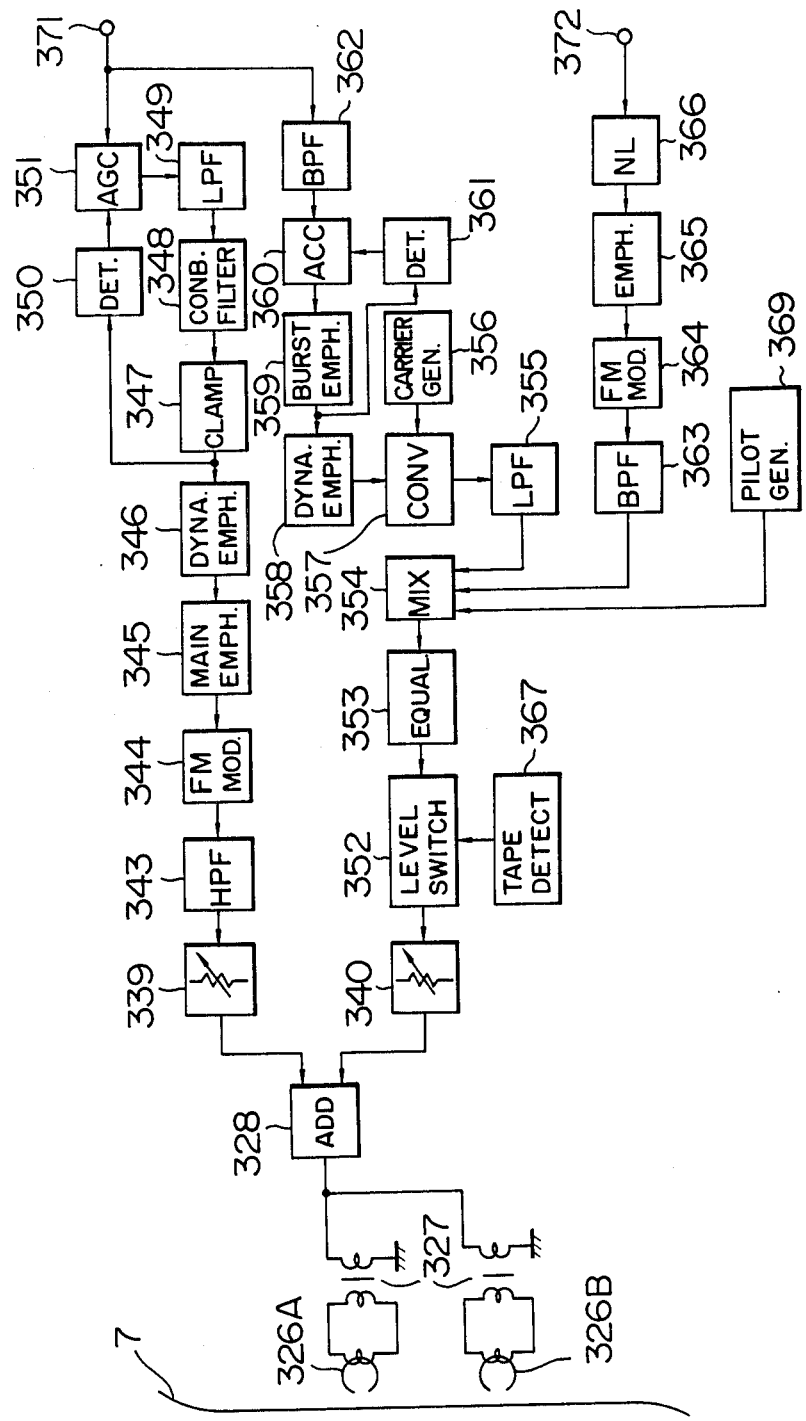
FIG. 35 is a block diagram as one embodiment of the recording circuit in the case where no time compressed audio signal is recorded.

Although the recording current level setting circuit 341 and level switching circuit 368 shown in FIG. 33 are needed to correctly set the level of the pilot signal to be recorded in the overlap track section, even if the recording level of the pilot signal is raised, the error rate of $A_{PCM}$ will merely slightly deteriorate; therefore, it is enough to set the recording level to be a little bit larger than the recording level in the video track, or these circuits may be unnecessary. FIG. 35 is a block diagram showing one embodiment of the recording circuit in the case where it is not necessary to record the $A_{PCM}$ signal. The embodiment shown in FIG. 35 is substantially the same as that shown in FIG. 33 except that the switches 334, 335, 336, and 337 of FIG. 33 have been deleted.

We claim:

1. A recording and reproducing apparatus for video and audio signals having two magnetic heads disposed on opposite sides by 180 degrees of the rotation angle on a head rotation mechanism to form slanted recording tracks on a magnetic tape during a recording operation and for tracing the tracks during a reproducing operation, including:

means for wrapping and guiding the magnetic tape around said head rotation mechanism at larger than 180 degrees of the rotation angle so as to form a main track and an additional track, said additional track being formed in a period when said two magnetic heads simultaneously trace on said magnetic tape;

means for recording a time compressed audio signal on said additional track; and means for recording a video signal on said main track; wherein said apparatus comprises:

means for compressing an input audio signal into a time compressed audio signal;

means for extracting a luminance signal and a carrier color signal from an inputted video signal;

modulation means for frequency modulating a carrier signal with said extracted luminance signal to produce a frequency modulation luminance signal;

means for converting the frequency of said extracted carrier color signal into another frequency lower than the frequency of said frequency modulation luminance signal to produce a lower frequency conversion carrier color signal;

means for generating a pilot signal having a frequency lower than the frequency of said lower frequency conversion carrier color signal, said pilot signal being used for control of tracking of the recording tracks during the reproducing operation;

means for recording on said main track, by said two magnetic heads, a first mixing signal produced by mixing said frequency modulation luminance signal, said lower frequency conversion carrier color signal and said pilot signal;

means for recording on said additional track, by said two magnetic heads, a second mixing signal produced by mixing said time compressed audio signal with said pilot signal, the time period of said time compressed audio signal being no longer than the period of said additional track; and means for simultaneously supplying the same pilot signals to said two magnetic heads during recording on said additional track, said pilot signal recorded on the additional track being the same as the pilot signal recorded on the main track.

2. A recording and reproducing apparatus according to claim 1, further comprising means for selecting one of said first and second mixing signals and for supplying the selected one to said magnetic heads; a first regulating circuit for setting the signal level of said time compressed audio signal; and a second regulating circuit for setting the signal level of said frequency modulation luminance signal.

3. A recording and reproducing apparatus according to claim 2, further comprising: means for producing said first mixing signal by mixing the output signal of said second regulating circuit with said lower frequency conversion carrier color signal and said pilot signal; and means for producing said second mixing signal by mixing the output signal of said first regulating circuit with said pilot signal.

4. A recording and reproducing apparatus according to claim 1, further comprising modulation: means for converting an audio signal inputted at the same time as the video signal into a frequency modulation audio signal having a frequency range between the frequency ranges of said frequency modulation luminance signal and said lower frequency conversion carrier color signal; means for mixing said frequency modulation audio signal, said lower frequency conversion carrier color signal and said pilot signal; and means for setting the signal level of the output of said mixing means; said first mixing signal recording means recording the signal which is produced by mixing the set output signal of said mixing means with said frequency modulation luminance signal on the main recording track.

5. A recording and reproducing apparatus according to claim 1, further comprising: first and second switching means for selecting said first and second mixing signals, respectively; said first switching means selecting said second mixing signal for enabling recording on said additional track by one of said two magnetic heads when said second switching means selects said first mixing signal for enabling recording on said main track by the other of said magnetic heads; and said second switching means selecting said second mixing signal for enabling recording on said additional track by one of said two magnetic heads when said first switching means selects said first mixing signal for enabling recording on said main track by the other of said magnetic heads.

6. A recording and reproducing apparatus according to claim 5, further comprising: means for changing the signal levels of said lower frequency conversion carrier color signal and said pilot signal; and means for controlling said changing means in accordance with the type of magnetic tape utilized.

7. A recording and reproducing apparatus according to claim 5, further comprising: first regulating means for setting the signal level of said time compressed audio signal; and second regulating means for setting the signal level of said frequency modulation luminance signal; said first mixing signal being produced by mixing the output signal of the first regulating means with said lower frequency conversion carrier color signal and said pilot signal, said second mixing signal being produced by mixing the output signal of said first regulating means with said pilot signal.

8. A recording and reproducing apparatus according to claim 1, further comprising means for increasing the signal level of said pilot signal recorded on said additional track to a level larger than the signal level of said pilot signal recorded on said main track.

9. A recording and reproducing apparatus according to claim 1, further comprising: a reproduction unit including a first pre-amplifier for amplifying a signal reproduced b one of said magnetic heads; a second pre-amplifier for amplifying a signal reproduced by the other of said magnetic heads; audio signal reproduction circuit means for reproducing an original audio signal from the time compressed audio signal; a luminance signal reproduction circuit means for reproducing an original luminance signal from the frequency modulation luminance signal; color signal reproduction circuit means for reproducing an original carrier color signal from the lower frequency conversion carrier color signal; and a pilot signal processing circuit means for detecting tracking information from a reproduced pilot signal; first and second switching means for selectively outputting one of the output signals of said first and second pre-amplifiers; a first amplitude equalizer disposed between said first switching means and said audio signal reproduction circuit means; a second amplitude equalizer disposed between said second switching means and said luminance signal reproduction circuit means; and means for supplying the output signal of said second switching means to said color signal reproduction circuit means and said pilot signal processing circuit means; said first switching means selecting the output signal of said first pre-amplifier when said second switching means selects the output signal of said second pre-amplifier, said first switching means selecting the output signal of said second pre-amplifier means when said second switching means selects the output signal of said first pre-amplifier.

10. A recording and reproducing apparatus according to claim 9, wherein said first and second pre-amplifiers, respectively, have a head peaking circuit with a peaking frequency lower than a peaking frequency of said first amplitude equalizer, a peaking frequency of said second amplitude equalizer being set lower than the peaking frequency of said head peaking circuit.

11. A recording and reproducing apparatus according to claim 9, further comprising: a negative feedback damping circuit in said first and second pre-amplifiers for damping a resonance characteristic of the amplifying circuit and a head resonance characteristic; a third amplitude equalizer provided between said first switching means and said audio signal reproduction circuit means; and fourth amplitude equalizer; peaking frequencies of said third and fourth amplitude equalizers being set lower than the resonance frequency of said amplifying circuit and the peaking frequency of said first amplitude equalizer and higher than the peaking frequency of said second amplitude equalizer.

12. A recording and reproducing apparatus according to claim 9, wherein said two magnetic heads have gaps whose azimuth angles are different from each other, said apparatus, further comprising: a third magnetic head having a gap whose azimuth angle is the same as one of said two magnetic heads; a third pre-amplifier for amplifying signal reproduced by said third magnetic head; and third switching means for selectively outputting one of the output signals of said second and third pre-amplifiers and for supplying the selected signal to said first and second switching means instead of the output signal of said second pre-amplifier to be supplied to said first and second switching means, so that the time compressed audio signal recorded on said additional track can be reproduced at a speed which is integer times of the tape running speed for recording.

13. A recording and reproducing apparatus for video and audio signals having two magnetic heads disposed on opposite sides by 180 degrees of the rotation angle on a head rotation mechanims to form slanted recording tracks on a magnetic tape during a recording operation and for tracing the tracks during a reproducing operation, including:
means for wrapping and guiding the magnetic tape around said rotation mechanism at larger than 180 degrees of the rotation angle so as to form a main track and an additional track, said additional track being formed in a period when said two magnetic heads simultaneously trace on said magnetic tape;
means for recording a time compressed audio signal on said additional track; and
means for recording a video signal on said main track;
wherein said apparatus comprises:
means for extracting a luminance signal and a carrier color signal from an inputted video signal;
modulation means for frequency modulating a carrier signal with said extracted luminance signal to produce a frequency modulation luminance signal;
means for converting the frequency of said extracted carrier color signal into another frequency lower than the frequency of said frequency modulation luminance signal to produce a lower frequency conversion carrier color signal;
means for compressing an input audio signal into a time compressed audio signal, the time period of said time compressed audio signal being no longer than the period of said additional track.
means for converting said time compressed audio signal into a pulse code modulation (PCM, signal:
means for converting an input audio signal which is simultaneously input together with the inputted video signal into a frequency modulated audio signal;
means for generating a pilot signal for controlling tracking during a reproducing operation;
means for mixing said lower frequency conversion carrier color signal, said frequency modulated audio signal and said pilot signal;
two first and second switches for respectively switching said PCM audio signal and said frequency modulated luminance signal in the periods of the main track and additional track, and for outputting said switched signal;
two third and fourth switches for respectively switching the output of said mixing means and said pilot signal in the periods of the main track and additional track, and for outputting said switched signal;
means for adding the output signals of said first and third switches, and for supplying the added output to one of said magnetic heads; and
means for adding the output signals of said second and fourth switches, and for supplying the added output to the other of said magnetic heads.

14. A recording and reproducing apparatus according to claim 13, further comprising regulator means for respectively setting the signal level of said PCM audio signal, said frequency modulated luminance signal, the output signal of said mixing means, and said pilot signal.

15. A recording and reproducing apparatus according to claim 13, further comprising regulator means for respectively setting the signal level of the output signals of said four switches.

* * * * *